US012562304B2

(12) United States Patent (10) Patent No.: US 12,562,304 B2
Zhang et al. (45) Date of Patent: Feb. 24, 2026

(54) INTEGRALLY-FORMED INDUCTOR AND POWER SUPPLY MODULE

(71) Applicant: Delta Electronics (Shanghai) CO., LTD, Shanghai (CN)

(72) Inventors: Mingzhun Zhang, Shanghai (CN); Jinping Zhou, Shanghai (CN); Min Zhou, Shanghai (CN)

(73) Assignee: Delta Electronics (Shanghai) CO., LTD., Shanghai (CN)

( * ) Notice: Subject to any disclaimer, the term of this patent is extended or adjusted under 35 U.S.C. 154(b) by 1005 days.

(21) Appl. No.: 17/684,462

(22) Filed: Mar. 2, 2022

(65) Prior Publication Data

US 2022/0285087 A1 Sep. 8, 2022

(30) Foreign Application Priority Data

Mar. 4, 2021 (CN) .......................... 202110239092.9

(51) Int. Cl.
| | |
|---|---|
| *H01F 27/04* | (2006.01) |
| *H01F 27/24* | (2006.01) |
| *H01F 27/29* | (2006.01) |
| *H02M 3/04* | (2006.01) |

(52) U.S. Cl.
CPC ............. *H01F 27/29* (2013.01); *H01F 27/24* (2013.01); *H02M 3/04* (2013.01)

(58) Field of Classification Search
CPC ...................................................... H01F 27/29
USPC ........................................................ 336/221
See application file for complete search history.

(56) References Cited

U.S. PATENT DOCUMENTS

| | | | |
|---|---|---|---|
| 8,174,348 | B2 | 5/2012 | Ikriannikov |
| 8,975,995 | B1 | 3/2015 | Ikriannikov et al. |
| 9,263,177 | B1 | 2/2016 | Ikriannikov et al. |
| 9,336,941 | B1 | 5/2016 | Ikriannikov |
| 10,256,031 | B2 | 4/2019 | Baker et al. |

(Continued)

FOREIGN PATENT DOCUMENTS

| | | |
|---|---|---|
| CN | 103081325 A | 5/2013 |
| CN | 102763179 B | 9/2015 |

(Continued)

OTHER PUBLICATIONS

See English translation of JP2005310864 (Year: 2005).*

(Continued)

*Primary Examiner* — Ronald Hinson
(74) *Attorney, Agent, or Firm* — Qinghong Xu

(57) ABSTRACT

An integrally-formed inductor includes a magnetic core and a first winding. The magnetic core includes a first surface and a second surface disposed opposite to each other, and a side surface disposed between the first surface and the second surface. The first winding includes a first longitudinal portion, a second longitudinal portion, and a first connecting portion provided between the first longitudinal portion and the second longitudinal portion. Wherein the first longitudinal portion extends to the first surface, forming a first pin. A projection of the first longitudinal portion on the first surface is within a range of the magnetic core. The second longitudinal portion extends to a plane where the second surface is positioned, and forms a second pin. The first winding and the magnetic core are integrally pressed by a mold to form the inductor.

19 Claims, 21 Drawing Sheets

(56)  References Cited

U.S. PATENT DOCUMENTS

| 2008/0265858 A1 | 10/2008 | Muratov |
| 2010/0007457 A1 | 1/2010 | Yan et al. |
| 2010/0013587 A1 | 1/2010 | Yan et al. |
| 2010/0060404 A1 | 3/2010 | Raiser et al. |
| 2011/0279100 A1* | 11/2011 | Ikriannikov .......... H02M 7/003 |
| | | 336/220 |
| 2014/0266552 A1 | 9/2014 | Silva et al. |
| 2017/0047155 A1* | 2/2017 | Yao ........................... H01F 3/10 |
| 2018/0204666 A1 | 7/2018 | Zhou et al. |
| 2019/0019610 A1 | 1/2019 | Lu et al. |
| 2019/0287708 A1 | 9/2019 | Yeh et al. |
| 2019/0378643 A1* | 12/2019 | Zhou .................. H01F 27/2823 |
| 2020/0219648 A1 | 7/2020 | Ji et al. |
| 2020/0395160 A1 | 12/2020 | Onozaki |

FOREIGN PATENT DOCUMENTS

| CN | 103141021 B | 9/2015 |
| CN | 105097227 A | 11/2015 |
| CN | 103887038 B | 6/2017 |
| CN | 107046366 A | 8/2017 |
| CN | 207074591 U | 3/2018 |
| CN | 111415812 A | 7/2020 |
| CN | 108292556 B | 10/2020 |
| CN | 111899962 A | 11/2020 |
| CN | 212209112 U | 12/2020 |
| WO | 2020121592 A1 | 6/2020 |

OTHER PUBLICATIONS

Extended European Search Report dated Aug. 5, 2022 of European Application No. 22159639.8.

Extended European Search Report dated Aug. 17, 2022 of European Application No. 22159751.1.

Extended European Search Report dated Aug. 17 of European Application No. 22159645.5.

Notice of Allowance dated Jan. 25, 2024 for U.S. Appl. No. 17/684,459.

1st Office Action dated May 30, 2025 of Chinese Application No. 202111061104X.

1st Office Action dated Mar. 27, 2025 of Chinese Application No. 2021102390929.

Notice of Allowance dated Jun. 23, 2025 of U.S. Appl. No. 17/653,134.

2nd Office Action dated Sep. 16, 2025 of Chinese Application No. 2021102390929.

* cited by examiner

INTEGRALLY-FORMED INDUCTOR AND POWER SUPPLY MODULE

CROSS REFERENCE

This application is based upon and claims priority to Chinese Patent Application No. 202110239092.9, filed on Mar. 4, 2021, the entire contents thereof are incorporated herein by reference.

TECHNICAL FIELD

This disclosure relates to an integrally-formed inductor and a power supply module.

BACKGROUND

In recent years, with the development of the technology such as data centers and artificial intelligence, and an operating speed of a central processing unit (CPU), a graphics processing unit (GPU) and an integrated chip (IC) becomes faster and faster, and an operating current is increasing, so that a power supply module such as a voltage regulation module (VRM) that supplies power for these devices has a harsh demand on power density, efficiency, and dynamic performance etc., thereby providing an extremely high challenge for the design of VRM.

In the VRM, a volume of an inductor has a high occupation, and an inductance of the inductor is also a main factor that directly affects efficiency and dynamic performance of the entire VRM. As the VRM has an increased power density and further reduced volume, the design of the VRM heat dissipation is facing huge challenge, and even becomes a bottleneck in the development of VRM technology.

As shown in FIG. 1a which is a schematic structural view of a VRM disclosed in Chinese Patent Application CN107046366A. In the VRM structure shown in FIG. 1a, the switching unit 21 as a heat source is disposed above the inductor 10. The inductor 13 has one end disposed on an upper surface of the inductor 10 and connected with the switching unit 21, and the other end disposed on a lower surface of the inductor 10 and connected with a load. Such arrangement is provided such that the switching unit 21 containing the heat source is directly connected to a radiator (not shown) above, thereby maximizing a heat dissipation capacity of the VRM.

In the inductor structure as shown in FIG. 1a, a magnetic core includes a first magnetic substrate 11, a second magnetic substrate 12, and a filling layer 15 therebetween. The first magnetic substrate 11 is provided with a first via 111, and the second magnetic substrate 12 is provided with a second via 121. A first conductor portion and a second conductor portion of an inductor coil 13 are respectively formed on the first via 111 and the second via 121 by a coated copper or a filling. Although the inductor in FIG. 1a meets a requirement that pins are disposed on the upper and lower surfaces simultaneously, the magnetic substrate of the inductor as shown in FIG. 1a is made of a high-permeability magnetic material and does not have any air gap, so that the magnetic substrate in FIG. 1a is easy to saturate and has a low utilization rate. The first magnetic substrate 11 and the second magnetic substrate 12 of the inductor in FIG. 1a are combined in an assembling manner, and a gap between the two magnetic substrates cannot be avoided. The assembling gap can produce an edge magnetic flux. The edge magnetic flux can produce eddy current loss (Fringing Effect) on the pins around the magnetic core. Such assembling manner results in that an assembly tolerance is hardly avoided, thereby being harmful to the arrangement of the power connection components; and in addition, the inductor structure as shown in FIG. 1a is not easy to implement an inverse coupling.

The inverse coupling inductor technique can provide a smaller dynamic inductance to meet high dynamic performance requirements, and also can provide a high steady-state inductance to meet high efficiency requirements. Therefore, inverse coupling inductor is another current design hotspot in the field of VRM module power supply.

The inductor shown in FIG. 1B is another existing inductor that can be used in the VRM structure as shown in FIG. 1a. As shown in FIG. 1B, a winding of the inductor extends to the top and bottom surfaces of the inductor from the sides of the inductor, so that the pins are disposed on the upper and lower surfaces while the inductor as shown in FIG. 1B realizes the inverse coupling. However, the inductor as shown in FIG. 1B, a winding thereof extends from the sides to the top and bottom surfaces. A path of the winding is too long such that under an operating condition of the VRM having low-voltage and high-current, the long winding means a large DC loss, which is not beneficial to the improvement of the efficiency. In addition, the winding of the inductor extends from the sides, thereby limiting the space for the power connection components on the sides of the inductor and being harmful for the improvement of the utilization rate of the magnetic core.

As above described, in the VRM system structure as shown in FIG. 1a, there is an urgent need to develop an inductor that can simultaneously satisfy that the pins are disposed on the upper and lower surfaces, the path of the winding is short, and inverse coupling effect can be easily achieved, which have challenges. No related art can meet the requirement for inductor of the VRM structure as shown in FIG. 1a.

SUMMARY

According to one aspect of this disclosure, an integrally-formed inductor is provided, the integrally-formed inductor includes a magnetic core and a first winding. The magnetic core includes a first surface, a second surface, and a side surface, the first surface and the second surface are disposed opposite to each other, and the side surface is disposed between the first surface and the second surface. The first winding includes a first longitudinal portion, a second longitudinal portion, and a first connecting portion being provided between the first longitudinal portion and the second longitudinal portion. The first longitudinal portion extends to the first surface, and a projection of the first longitudinal portion on the first surface is within a range of the magnetic core, and the first longitudinal portion forms a first pin on the first surface. The second longitudinal portion extends to a plane where the second surface is positioned, and forms a second pin on the plane where the second surface is positioned. And the first winding and the magnetic core are integrally pressed by a mold to form the inductor.

According to an embodiment of this disclosure, a projection length of the first winding in a horizontal direction is greater than a projection length of the first winding in a height direction of the magnetic core, the horizontal direction is perpendicular to the height direction of the magnetic core.

According to an embodiment of this disclosure, the first winding is buried in the magnetic core, and a distance between the first winding and the side surface of the magnetic core is not less than 300 µm.

According to an embodiment of this disclosure, the second longitudinal portion at least partially exposes to the side surface.

According to an embodiment of this disclosure, the inductor further includes a second winding including a third longitudinal portion, a fourth longitudinal portion, and a second connecting portion being provided between the third longitudinal portion and the fourth longitudinal portion; wherein the third longitudinal portion extends to the first surface, and forms a third pin on the first surface, the fourth longitudinal portion extends to a plane where the second surface is positioned, and forms a fourth pin on the plane where the second surface is positioned.

According to an embodiment of this disclosure, a projection of the third longitudinal portion on the first surface is within a range of the magnetic core.

According to an embodiment of this disclosure, the second winding is buried in the magnetic core, and a distance between the second winding and the side surface is not less than 300 µm.

According to an embodiment of this disclosure, the fourth longitudinal portion at least partially exposes to the side surface.

According to an embodiment of this disclosure, the first connecting portion is U-shaped, arc-shaped, C-shaped, straight line-shaped, Z-shaped or racetrack-shaped, or the first connecting portion is rectangular with a notch; and the second connecting portion is U-shaped, circular arc-shaped, C-shaped, straight line-shaped, Z-shaped or racetrack-shaped, or the first connecting portion is rectangular with a notch.

According to an embodiment of this disclosure, the first connecting portion and the second connecting portion are at least partially stacked along a height direction of the magnetic core.

According to an embodiment of this disclosure, the first connecting portion and the second connecting portion are stacked along a width direction of the magnetic core.

According to an embodiment of this disclosure, when a current flows through the first winding from the first pin and flows through the second winding from the third pin, the magnetic fluxes generated by the current in the first connecting portion and the second connecting portion are weakened.

According to an embodiment of this disclosure, a minimum separation distance between the first connecting portion and the second connecting portion is smaller than a minimum separation distance between the first longitudinal portion and the third longitudinal portion.

According to an embodiment of this disclosure, a length of the first connecting portion is greater than a sum of a length of the first longitudinal portion and a length of the second longitudinal portion, and a length of the second connecting portion is greater than a sum of the length of the first longitudinal portion and the length of the second longitudinal portion.

According to an embodiment of this disclosure, a sectional area of the first longitudinal portion, a sectional area of the second longitudinal portion, a sectional area of the third longitudinal portion, and a sectional area of the fourth longitudinal portion all are larger than a sectional area of the first connecting portion and a sectional area of the second connecting portion.

According to an embodiment of this disclosure, the first connecting portion is rectangular with a notch, and a space enclosed by the first connecting portion is defined as a first space, the second connecting portion is rectangular with a notch, and a space enclosed by the second connecting portion is defined as a second space, the first connecting portion is at least partially located in the second space, and the second connecting portion is at least partially located in the first space.

According to an embodiment of this disclosure, the first connecting portion is rectangular, the first connecting portion is provided with a first notch, the second longitudinal portion is provided with a second notch; the second connecting portion is rectangular, and the second connecting portion is provided with a third notch, the third longitudinal portion is provided with a fourth notch, wherein the first connecting portion and the second connecting portion are stacked along the height direction of the magnetic core by avoiding the first notch and the fourth notch from each other and avoiding the second notch and the third notch from each other.

According to an embodiment of this disclosure, the magnetic core is made of magnetic powder material with distributed air gap.

According to another aspect of this disclosure, a power supply module is provided, the power supply module includes an integrally-formed inductor of above embodiments and an integrated power module, wherein the integrated power module is stacked on the first surface of the magnetic core and includes a first switching unit, wherein the first switching unit is electrically connected with the first pin; and the second pin is configured as a first power output terminal of the power supply module.

According to an embodiment of this disclosure, the inductor further includes a second winding including a third longitudinal portion, a fourth longitudinal portion, and a second connecting portion being provided between the third longitudinal portion and the fourth longitudinal portion, wherein the third longitudinal portion extends to the first surface, and forms a third pin on the first surface, the fourth longitudinal portion extends to a plane where the second surface is positioned, and forms a fourth pin on the plane wherein the second surface is positioned; the integrated power module further includes a second switching unit, and the second switching unit is electrically connected with the third pin; and the fourth pin is configured as a second power output terminal of the power supply module.

According to an embodiment of this disclosure, the power supply module further includes a power connection component and a signal connection component disposed on the side surface of the magnetic core.

BRIEF DESCRIPTION OF THE DRAWINGS

The above and other features and advantages of the present disclosure will become more apparent by describing specifically exemplary embodiments thereof with reference to the accompanying drawings.

FIG. 1B shows another inductor in the related art, which may be used in the VRM structure as shown in FIG. 1a;

FIG. 3b is an exploded view of the power supply module as shown in FIG. 3a;

FIG. 3c is a perspective view of an integrally-formed inductor in the power supply module as shown in FIG. 3a;

FIG. 4b is a perspective view of the integrally-formed inductor as shown in FIG. 4a;

FIG. 4c is a perspective view of assembled the first winding and the second winding in the integrally-formed inductor as shown in FIG. 4a;

FIG. 4d is an exploded perspective view of the first winding and the second winding in the integrally-formed inductor as shown in FIG. 4a;

FIG. 4e is a top view of FIG. 4c;

FIG. 5a is a perspective view of an integrally-formed inductor according to another embodiment of this disclosure;

FIG. 5b is a perspective view of the integrally-formed inductor as shown in FIG. 5a;

FIG. 5c is a perspective bottom view of the integrally-formed inductor as shown in FIG. 5a;

FIG. 6a is a perspective view of an integrally-formed inductor according to another embodiment of this disclosure;

FIG. 6b is a perspective view of the integrally-formed inductor as shown in FIG. 6a;

FIG. 6c is a perspective top view of FIG. 6a;

FIG. 6d is a perspective view of assembled the first winding and the second winding in the integrally-formed inductor as shown in FIG. 6a;

FIG. 6e is an exploded perspective view of the first winding and the second winding in the integrally-formed inductor as shown in FIG. 6a;

FIG. 7a is a perspective view of an integrally-formed inductor according to another embodiment of this disclosure;

FIG. 7b is a perspective view of the integrally-formed inductor as shown in FIG. 7a;

FIG. 7c is a perspective view of assembled the first winding and the second winding in the integrally-formed inductor as shown in FIG. 7a;

FIG. 8a is a perspective view of an integrally-formed inductor according to another embodiment of this disclosure;

FIG. 8b is a perspective top view of the integrally-formed inductor as shown in FIG. 8a;

FIG. 8c is a perspective front view of the integrally-formed inductor as shown in FIG. 8a;

FIG. 8d is a perspective view of assembled the first winding and the second winding in the integrally-formed inductor as shown in FIG. 8a;

FIG. 8e is an exploded perspective view of the first winding and second winding as shown in FIG. 8d viewed from one angle;

FIG. 8f is an exploded perspective view of the first winding and second winding as shown in FIG. 8d viewed from another angle;

FIG. 9b is a perspective top view of the integrally-formed inductor as shown in FIG. 9a;

FIG. 9c is a perspective front view of the integrally-formed inductor as shown in FIG. 9a;

FIG. 9d is a perspective view of assembled the first winding and the second winding in the integrally-formed inductor as shown in FIG. 9a.

DETAILED DESCRIPTION

Figure 1A:
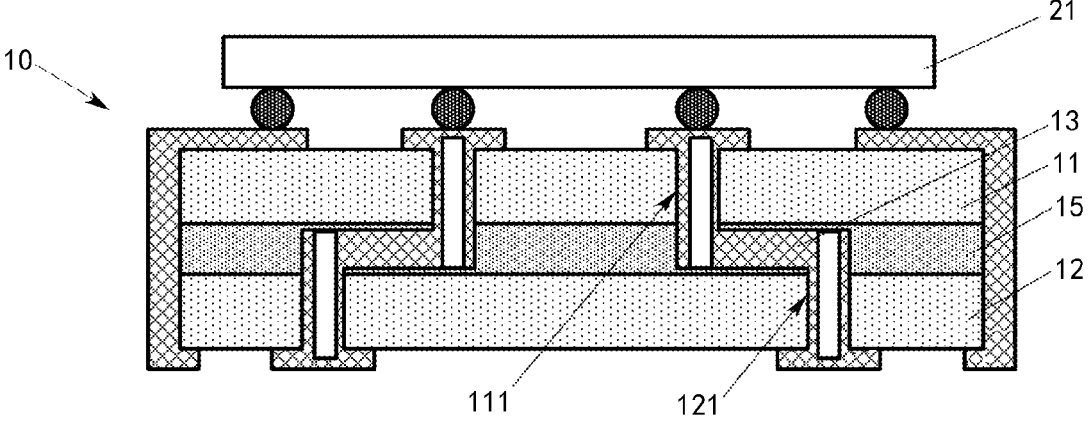
FIG. 1a is a schematic structural view of a VRM in the related art.
Figure 1B:
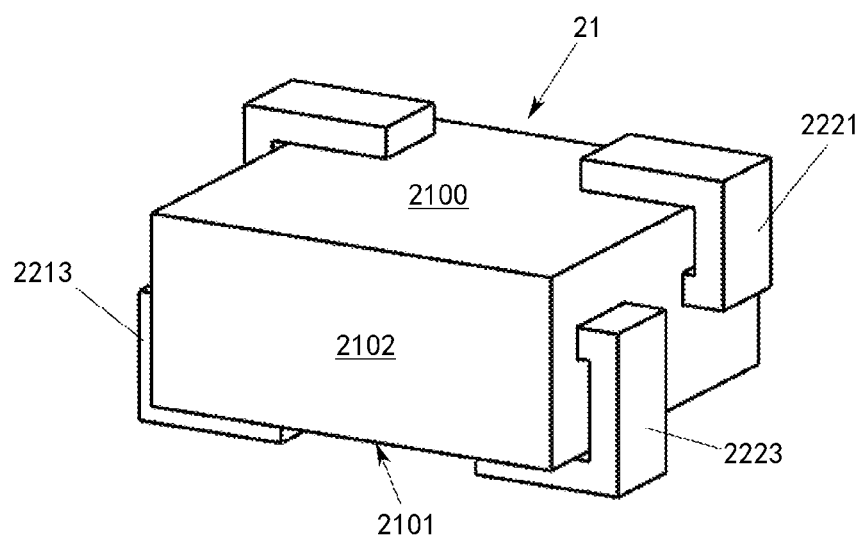

Now, the exemplary implementations will be described more completely with reference to the accompanying drawings. However, the exemplary implementations can be made in various forms and should not be construed as limiting the implementations as set forth herein. Instead, these implementations are provided so that the present disclosure will be thorough and complete, and concept of the exemplary implementation will be completely conveyed to a person skilled in the art. Same reference numbers denote the same or similar structures in the drawings, thereby omitting the detailed description thereof.

The First Embodiment

Figure 2:
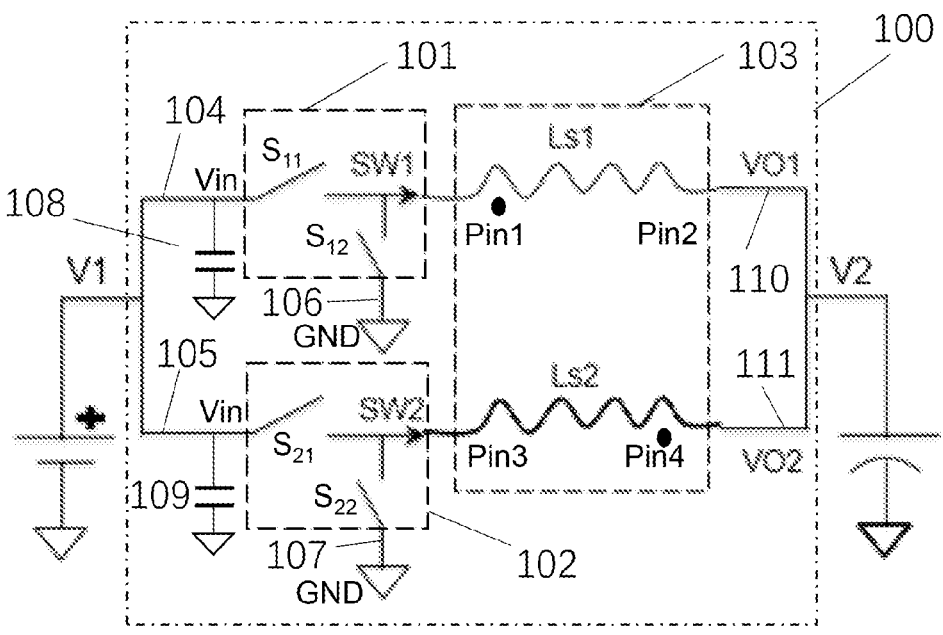
FIG. 2 is a circuit topology view of a two-phase VRM.

As shown in FIG. 2, which is a circuit topology view of a two-phase VRM, The VRM 100 includes a first switching unit 101, a second switching unit 102, a two-phase inverse coupling inductor 103, input connecting wires 104 and 105, ground connecting wires 106 and 107, input capacitors 108 and 109, and output power connecting wires 110 and 111. The input connecting wires 104 and 105 are connected to an input voltage V1 and connected with Vin terminals of the switching units 101 and 102. The ground connecting wires 106 and 107 are connected to GND terminals of the switching units 101 and 102. The first switching unit 101 includes two switch tubes S11 and S12 which are connected to a node SW1, and the node SW1 is connected with the first pin of the inverse coupling inductor, that is, an input pin pin1. The second switching unit 102 includes two switch tubes S21 and S22 which are connected to a node SW2, and the node SW2 is connected with a third pin pin3 of the inverse coupling inductor; the first pin pin1 and the third pin pin3 of the inverse coupling inductor 103 are terminals of different magnetic polarity; the so-called terminals of different magnetic polarity refer to when the current respectively flows in from this two terminals, the magnetic flux are weaken each other, that is, the mutual inductance M between the two windings is a negative value. The second pin pin2 and fourth pin pin4 of the inverse coupling inductor 103 are connected to the load directly or through the output power connecting wires 110, 111 to provide an output voltage V2 for the load.

Figure 3B:
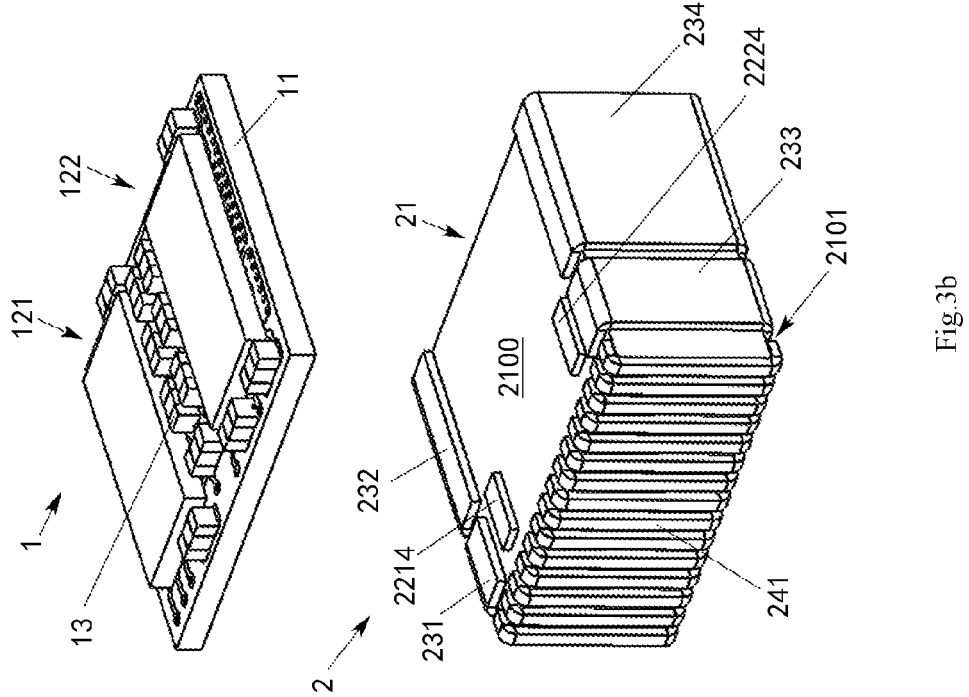
Figure 3A:
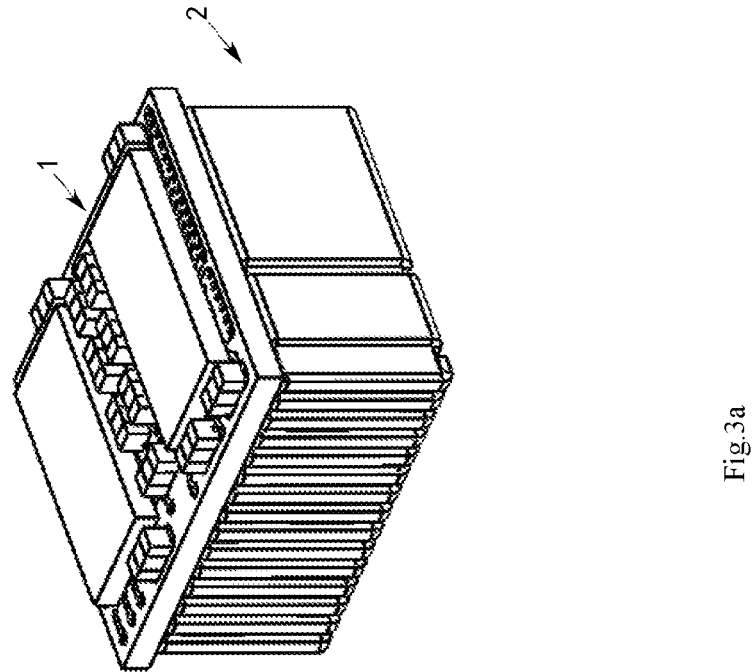
FIG. 3a is a schematic structural view of a power supply module according to an embodiment of this disclosure.

Referring to FIG. 3a and FIG. 3b, FIG. 3a is a schematic structural view of the power supply module according to the first embodiment of this disclosure; and FIG. 3b is an exploded view of the power supply module as shown in FIG. 3a. FIG. 3a and FIG. 3b show the power supply module according to the first embodiment of this disclosure. The power supply module includes an integrated power module (IPM) 1, one integrally-formed inductor 2 and a plurality of conductive elements.

The integrated power module 1 is stacked on the first surface of the integrally-formed inductor 2, for example, on an upper surface 2100 of the magnetic core 21. The integrated power module includes a printed circuit board 11, a first switching unit 121, a second switching unit 122, and a capacitor 13.

The integrally-formed inductor 2 of this disclosure has various structures, which will be explained one by one below.

Figure 3C:
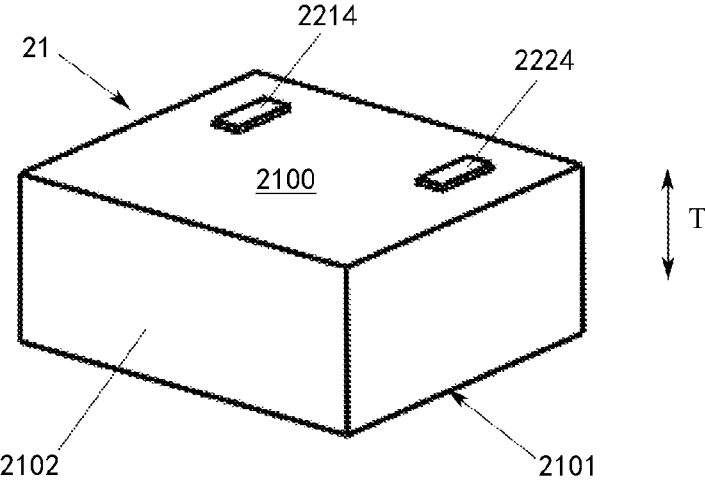
Figure 3D:
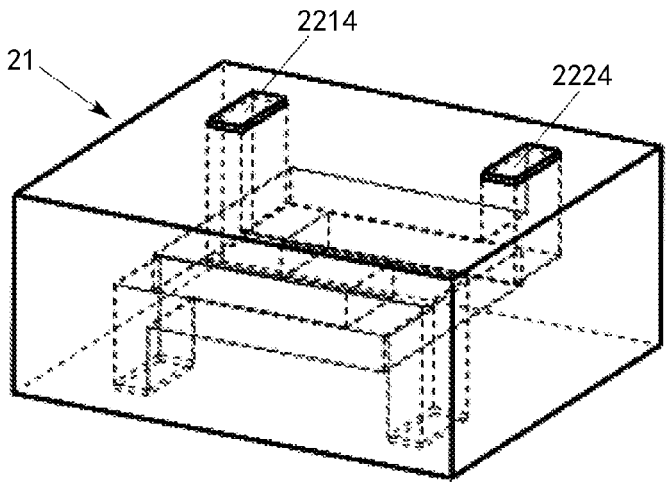
FIG. 3d is a perspective view of the integrally-formed inductor of FIG. 3c.
Figure 3E:
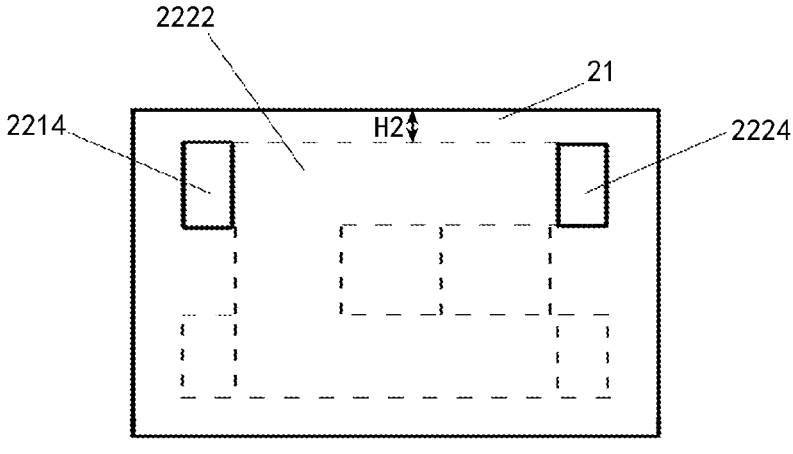
FIG. 3e is a perspective top view of FIG. 3c.
Figure 3F:
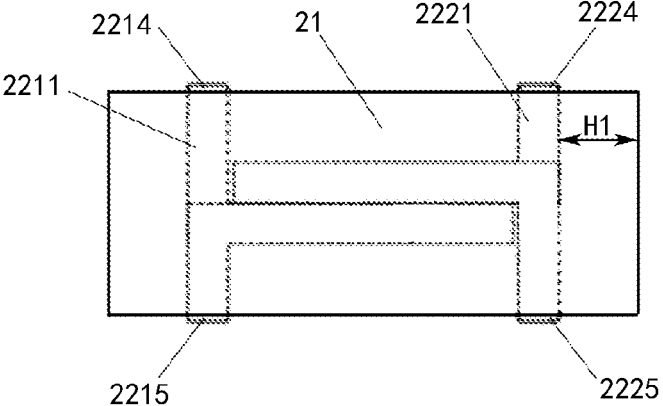
FIG. 3f is a perspective front view of FIG. 3c.
Figure 3G:
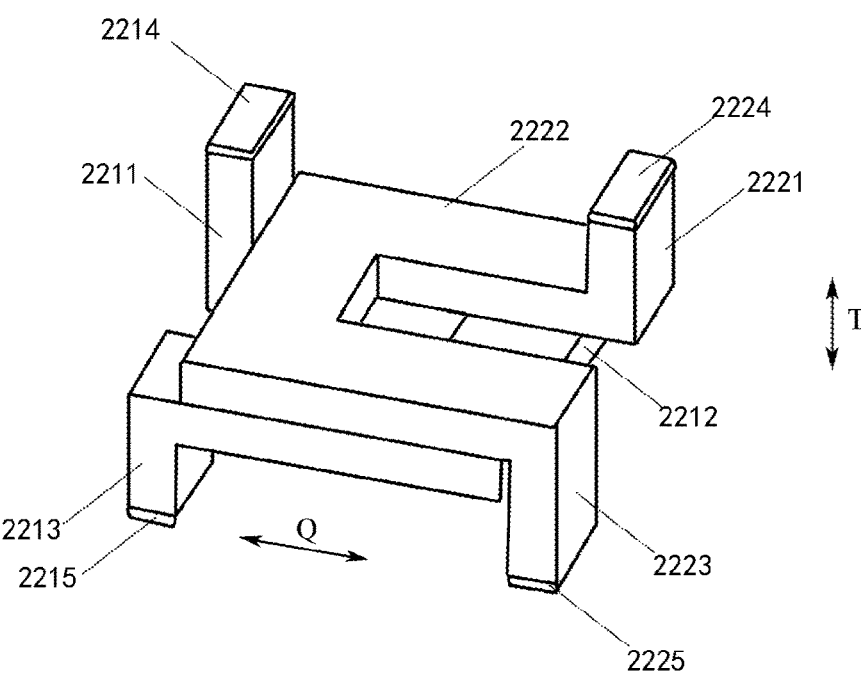
FIG. 3g is a perspective view of assembled the first winding and the second winding in the integrally-formed inductor as shown in FIG. 3c.
Figure 3H:
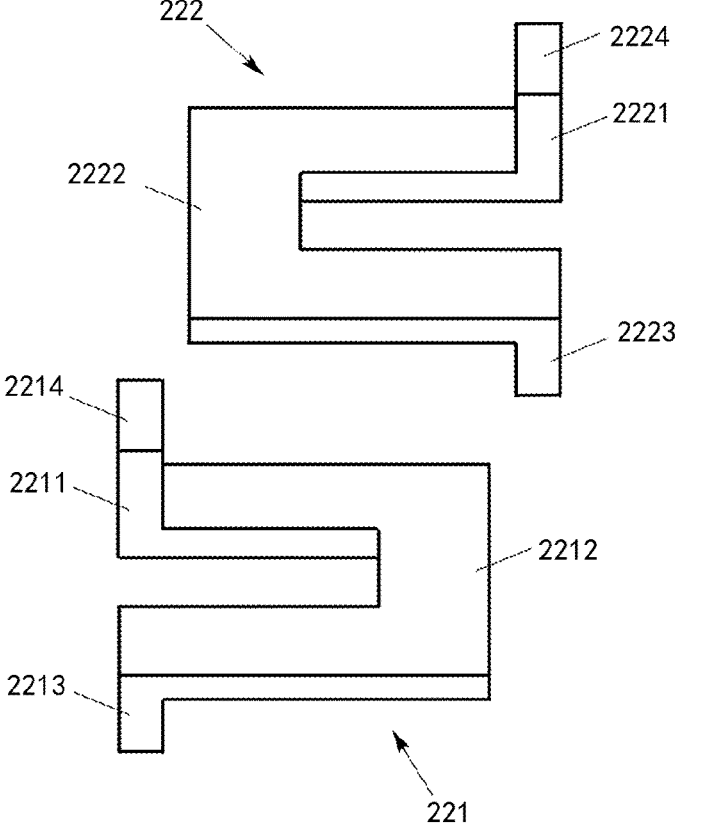
FIG. 3h is an exploded perspective view of the first winding and second winding in the integrally-formed inductor as shown in FIG. 3c.
Figure 3I:
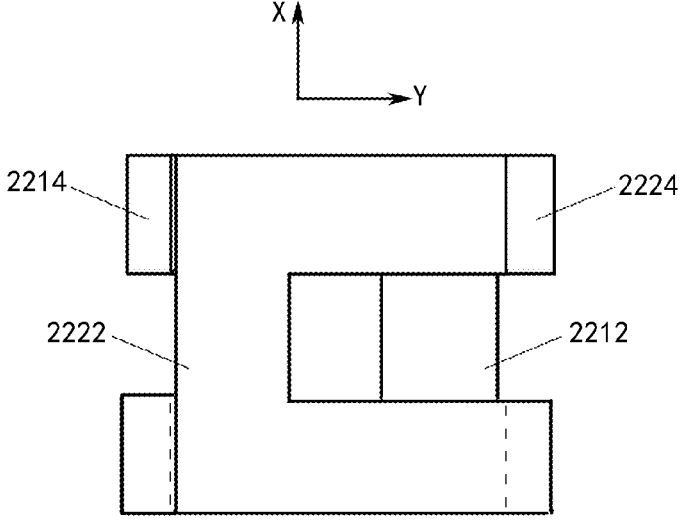
FIG. 3i is a top view of FIG. 3g.
Figure 3J:
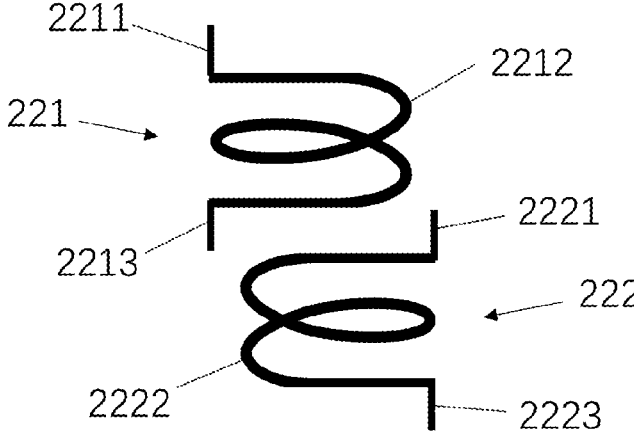
FIG. 3j is a perspective view showing a first connecting portion of the first winding and a second connecting portion of the second winding in the integrally-formed inductor as shown in FIG. 3c.

Referring to FIGS. 3c to 3j, which show the structure of the integrally-formed inductor according to the first embodiment of this disclosure. FIG. 3c is a perspective view of the integrally-formed inductor in the power supply module as shown in FIG. 3a. FIG. 3d is a perspective view of the integrally-formed inductor of FIG. 3c. FIG. 3e is a perspective top view of FIG. 3c. FIG. 3f is a perspective front view of FIG. 3c. FIG. 3g is a perspective view of assembled the first winding and the second winding in the integrally-formed inductor as shown in FIG. 3c. FIG. 3h is an exploded perspective view of the first winding and the second winding in the integrally-formed inductor as shown in FIG. 3c. FIG. 3i is a top view of FIG. 3g. FIG. 3j is a perspective view of a first connecting portion of the first winding and a second connecting portion of the second winding of the integrally-formed inductor as shown in FIG. 3c.

The integrally-formed inductor of the first embodiment of this disclosure includes a magnetic core 21 and a winding. The "integrally-formed" inductor refers to putting the winding and the magnetic material such as magnetic powder into a mold, to be formed by the integral pressing of the mold. Compared to the assembled structure of the magnetic plate in the related art, the integrally-formed inductor has no centralized air gap, so there is no problem of eddy current loss (Fringing Effect); the existence of distributed air gap in the integrally-formed inductor can increase the saturation current of the inductor, thereby not being easy to saturate; furthermore, the integrally-formed inductor has no assembly tolerance, and its dimensional tolerance is completely determined by the mold tolerance, and the precision of the mold is relatively high, so that the dimensional accuracy of the integrally-formed inductor is high, thereby being beneficial to arrange power connection components on the side surface of the inductor.

As shown in FIGS. 3c and 3d, the magnetic core 21 has a first surface (i.e., a top surface 2100), a second surface (i.e., a bottom surface 2101), and a side surface 2102. The top surface 2100 and the bottom surface 2101 are disposed opposite to each other, and the side surface 2102 is connected between the top surface 2100 and the bottom surface 2101. The magnetic core 21 shown in FIG. 3c is in the shape of a rectangular solid, but the shape of the magnetic core 21 of this disclosure is not limited thereto, and may also be in other shapes such as a flat cylinder.

As shown in FIG. 3g, FIG. 3h and FIG. 3i, the winding includes the first winding 221 and the second winding 222, which are buried in the magnetic core 21. In some other embodiments, only one winding such as the first winding 221 or the second winding 222 may also be included.

As shown in FIG. 3d, FIG. 3g and FIG. 3h, the first winding 221 is formed by connecting a first longitudinal portion 2211 in a longitudinal direction, a first connecting portion 2212 in a lateral direction and a second longitudinal portion 2213 in a longitudinal direction to one another, wherein the first connecting portion 2212 is U-shaped. The first longitudinal portion 2211 of the first winding 221 extends from the inside of the magnetic core 21 to the top surface 2100 of the magnetic core 21, and forms a first pin 2214 of the inductor on the top surface 2100 of the magnetic core 21. The second longitudinal portion 2213 of the first winding 221 extends from the inside of the magnetic core 21 to the bottom surface 2101 of the magnetic core 21, and forms a second pin 2215 of the inductor on the bottom surface 2101 of the magnetic core 21.

The second winding 222 is formed by connecting a third longitudinal portion 2221 in a longitudinal direction, a second connecting portion 2222 in a lateral direction and a fourth longitudinal portion 2223 in a longitudinal direction to one another, wherein the second connecting portion 2222 is U-shaped. The third longitudinal portion 2221 of the second winding 222 extends from the inside of the magnetic core 21 to the top surface 2100 of the magnetic core 21, and forms a third pin 2224 of the inductor on the top surface 2100 of the magnetic core 21. The fourth longitudinal portion 2223 of the second winding 222 extends from the inside of the magnetic core 21 to the bottom surface 2101 of the magnetic core 21, and form a fourth pin 2225 of the inductor on the bottom surface 2101. The first pin 2214 and the third pin 2224 of the inductor are disposed on the top surface 2100 of the magnetic core 21. The second pin 2215 and the fourth pin 2225 of the inductor are disposed on the bottom surface 2101 of the magnetic core 21.

The first longitudinal portion 2211 and the second longitudinal portion 2213 of the first winding 221 and the third longitudinal portion 2221 and the fourth longitudinal portion 2223 of the second winding 222 are also hereinafter referred to as longitudinal portions. The first connecting portion 2212 in the lateral direction of the first winding 221 is also hereinafter referred to as a lateral portion, and the second connecting portion 2222 in the lateral direction of the second winding 222 is also hereinafter referred to as a lateral portion. The lateral portions of the first winding 221 and the second winding 222 may be one turn or multiple turns, forming a spiral structure as shown in FIG. 3j. A winding with multiple turns of the lateral portion can obtain a larger inductance and reduce the loss of the magnetic core 21 in the case of the same size of the magnetic core 21.

As shown in FIG. 3g, the first connecting portion 2212 of the first winding 221 and the second connecting portion 2222 of the second winding 222 are stacked in a height direction T of the magnetic core 21. The magnetic fluxes of overlapped portions of the first connecting portion 2212 and the second connecting portion 2222 are mutual magnetic fluxes, so that the overlapped portions of the first winding and the second winding are coupled together, and the inductor forms a two-phase coupled inductor. when a current in the first winding 221 flows in from the first pin 2214 of the inductor and flows out from the second pin 2215 of the inductor, and a current in the second winding 222 flows in from the third pin 2224 of the inductor and flows out from the fourth pin 2225 of the inductor, a direction of the current in the first connecting portion 2212 of the first winding 221 is opposite to a direction of the current in the second connecting portion 2222 of the second winding 222. There-fore, the first winding and the second winding form a two-phase inverse coupling inductor.

A length of a projection of the first winding 221 in a horizontal direction Q is greater than a length of the pro-jection of the first winding in a height direction T of the magnetic core 21, and a length of a projection of the second winding 222 in the horizontal direction Q is greater than a length of the projection of the second winding in a height direction T of the magnetic core 21, to facilitate the inverse coupling inductor of this disclosure, wherein the height direction T of the magnetic core 21 refers to a direction from the top surface 2100 to the bottom surface 2101 of the magnetic core 21. The horizontal direction Q is perpendicu-lar to the height direction T of the magnetic core 21, the horizontal direction Q is parallel with the lateral direction, the height direction T of the magnetic core 21 is parallel with the longitudinal direction.

The longitudinal portions of the first winding 221 and the second winding 222 are linear, and the lateral portions, that is the first connecting portion 2212 and the second connect-ing portion 2222, are all U-shaped. Such arrangement allows the first connecting portion 2212 of the first winding 221 and the second connecting portion 2222 of the second winding 222 as long as possible, so as to increase the mutual magnetic flux between the two windings and improve the coupling effect; that is, in the case of the same leakage inductance, it is possible to obtain a great steady-state inductance and facilitate reducing a ripple current of the inductor so as to reduce the loss of the switching unit in the power module, thereby improving the efficiency of the power supply module.

As shown in FIGS. 3e and 3f, a projection of the first longitudinal portion 2211 and the third longitudinal portion 2221 of the winding on the top surface 2100 of the magnetic core 21 is within a range of the magnetic core 21. In the first embodiment, a projection of the second longitudinal portion 2213 and the fourth longitudinal portion 2223 of the winding on the top surface 2100 of the magnetic core 21 is within the range of the magnetic core 21. In some other embodiments, a projection of part of the longitudinal portions on the top surface 2100 of the magnetic core 21 may not be within the range of the magnetic core 21.

A distance H1 between the longitudinal portion of the winding (i.e., the third longitudinal portion 2221) and a side surface of the magnetic core 21 is greater than or equal to 300 um, so as to prevent the problems that the magnetic core 21 near the longitudinal portion of the winding has an uneven density and is easy to crack during a process of the inductor being integrally manufactured, and increase an equivalent magnetic flux cross-sectional area of the mag-netic core 21 near the longitudinal portion of the winding, thereby being beneficial to prevent a local saturation of the magnetic core and improve an utilization rate of the mag-netic core 21. Similarly, a distance H2 between the lateral portion of the winding (i.e., the second connecting portion 2222) and the side surface of the magnetic core 21 is greater than or equal to 300 um, which has the same effect.

In this disclosure, the first pin 2214 and third pin 2224 of the inductor are disposed on the top surface of the inductor, and may be directly connected to a pad of the first switching unit 101 and a pad of the second switching unit 102 of the integrated power module 1 respectively. A second pin 2215 of the inductor and a fourth pin 2225 of the inductor are disposed on the bottom surface of the inductor, and may be directly connected to a load. Such arrangement allows the power supply module has the shortest current path between the output and the load, which is also beneficial to reduce the winding connection impedance, reduce the loss, and improve the efficiency.

In the first embodiment, a plurality of conductive ele-ments is disposed around the magnetic core 21. The con-ductive element includes a first end and a second end, and the first end forms a fifth pin on the first surface (i.e., the upper surface) of the magnetic core, the second end forms a sixth pin on the second surface (i.e., the lower surface) of the magnetic core. The plurality of conductive elements includes, for example, a signal connection component and at least two sets of power connection components. At least two sets of power connection components are respectively dis-posed on the first side surface and the second side surface of the integrally-formed inductor, in which the first side and the second side are disposed oppositely. The signal connection component is disposed on the third side surface and/or the fourth side surface of the integrally-formed inductor, the third side surface and the fourth side surface are connected between the first side surface and the second side surface.

For example, as shown in FIG. 3b, at least two sets of power connection components include a first power connec-tion component disposed on the first side surface of the magnetic core 21 and a second power connection component disposed on the second side surface of the magnetic core 21. The first power connection component includes a first input conductive element 231 and a first ground conductive ele-ment 232; and the second power connection component includes a second input conductive element 233 and a second ground conductive element 234. The signal connec-tion component includes a plurality of signal conductive elements 241 which are disposed on the third side surface of the magnetic core.

As shown in the circuit topology principle view of FIG. 2, the input connecting wires 104 and 105 in FIG. 2 respectively correspond to the input conductive elements 231 and 233 in FIG. 3b; and the ground connecting wires 106 and 107 respectively correspond to the ground conduc-tive elements 232 and 234 in FIG. 3b. In the circuit topology principle view as shown in FIG. 2, the input connecting wire 104 and the ground connecting wire 106 form a loop through the first switching unit 101 and the input power supply. The existence of the loop can produce loop parasitic inductance. If the loop parasitic inductance resonates with the input capacitor, the efficiency of the power supply system can be affected. In order to reduce the parasitic inductance in the loop, the first input conductive element 231 and the first ground conductive element 232 in the first embodiment are disposed side by side to minimize the distance between the first input conductive element 231 and the first ground conductive element 232 as possible, and the smaller the distance is, the smaller the area of the loop is, as such the parasitic inductance in the loop is smaller, it is beneficial to improve the efficiency. Similarly, the second input conduc-tive element 233 and the second ground conductive element 234 are disposed side by side to minimize the distance therebetween as possible. The conductive elements all form pads on the first surface and the second surface of the magnetic core 21, that is, the fifth pin and the sixth pin as described above, for the power connection or signal trans-mission between the integrated power module 1 and the load. In other embodiments, the conductive elements may be disposed in different ways.

In the first embodiment, the first pin and the third pin of the integrally-formed inductor are disposed on the first surface of the integrally-formed inductor, and the second pin and the fourth pin are disposed on the second surface of the integrally-formed inductor, so that the four side surfaces of integrally-formed inductor all may be used to set up the power connection components and the signal connection components. In the integrally-formed inductor of this disclosure, the arrangement of the magnetic core and the pins of the winding provides sufficient space for the arrangement of the power connection components and the signal connection components of the power supply module.

The Second Embodiment

Figure 4B:
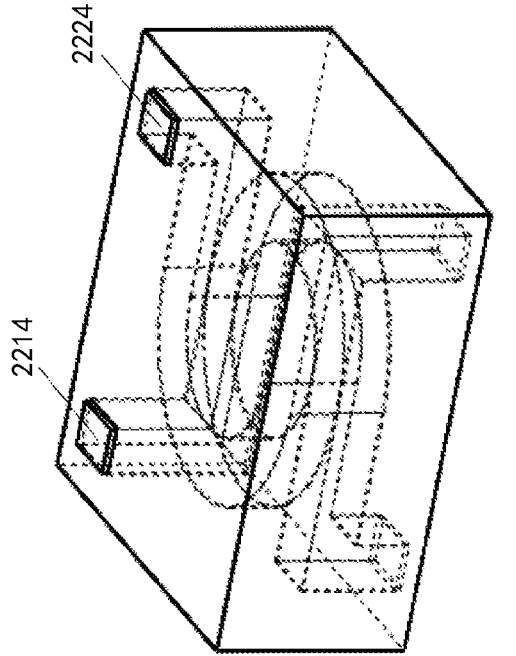
Figure 4A:
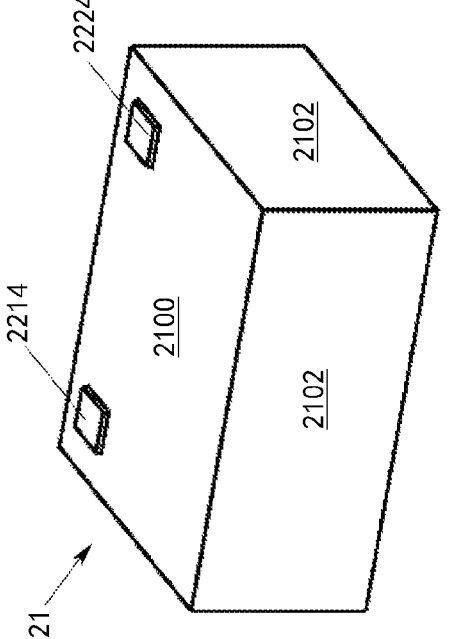
FIG. 4a is a perspective view of an integrally-formed inductor according to another embodiment of this disclosure.
Figures 4C, 4D, 4E:
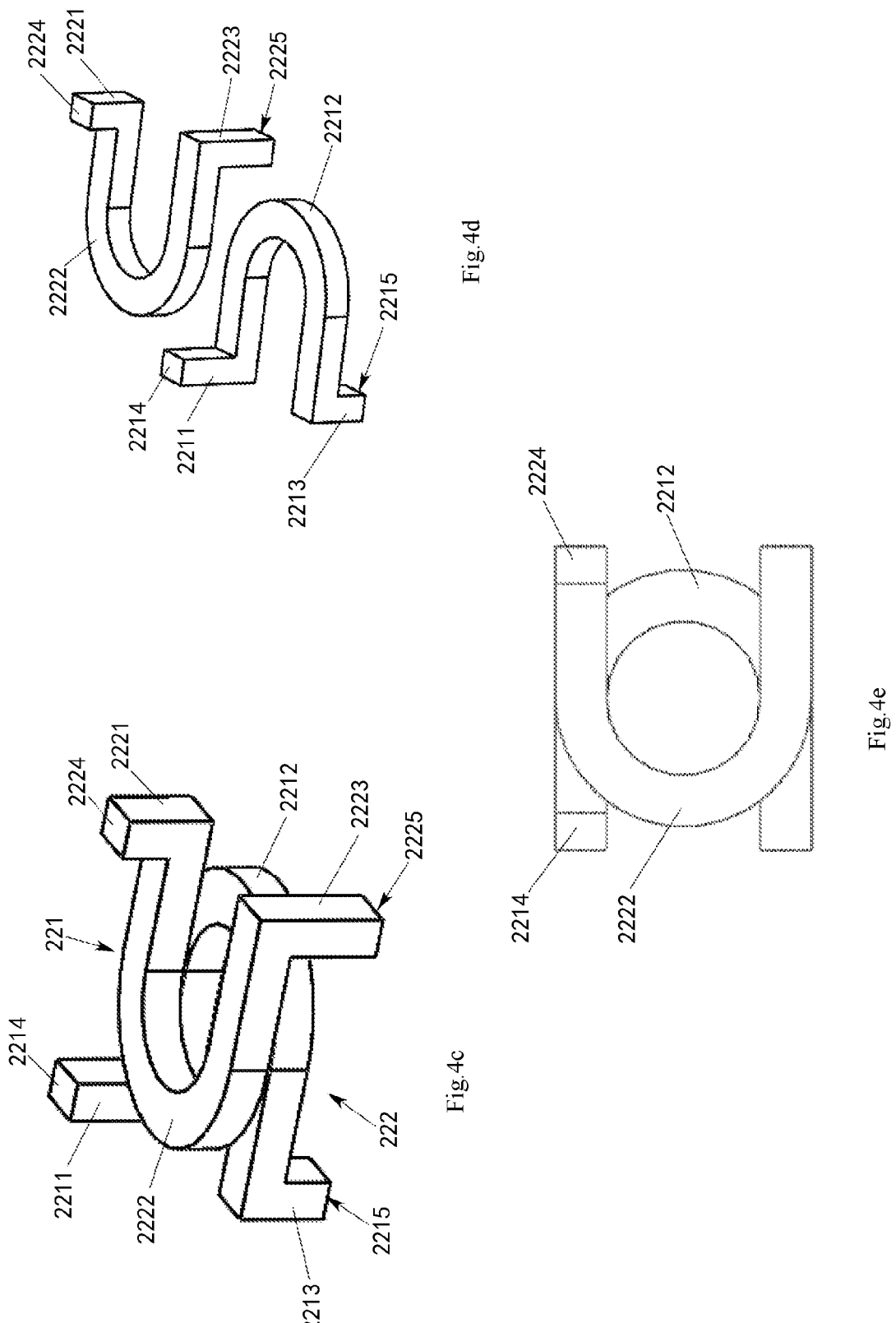

Referring to FIGS. 4a to 4e, FIGS. 4a and 4b are perspective views of the integrally-formed inductor according to the second embodiment of this disclosure; FIG. 4c is a perspective view of assembled the first winding and second winding in the integrally-formed inductor as shown in FIG. 4a; FIG. 4d is an exploded perspective view of the first winding and second winding in the integrally-formed inductor as shown in FIG. 4a; and FIG. 4e is a top view of FIG. 4c.

The difference between the integrally-formed inductor of the second embodiment and that of the first embodiment lies in the shape of the lateral portion of the winding.

Specifically, the lateral portion of the winding in the first embodiment is square; the first connecting portion 2212 of the first winding 221 in the second embodiment is arc-shaped or racetrack-shaped; and the second connecting portion 2222 of the second winding 222 is arc-shaped or racetrack-shaped.

In the second embodiment, compared to the winding, in which the first connecting portion is U-shaped in the first embodiment, the winding having the arc-shaped or the racetrack-shaped first connecting portion in the second embodiment has advantages on two aspects: the winding having the arc-shaped or racetrack-shaped connecting portion has a low DC impedance, which is beneficial to further reduce the loss of the winding and improve the efficiency; and the winding having the arc-shaped or racetrack-shaped connecting portion can be manufactured by using standardized copper wires, so that the manufacturing process is simpler and the mold used is simpler.

The other structures of the integrally-formed inductor of the second embodiment are basically the same as that of the first embodiment, and will not be repeated here.

The Third Embodiment

Figures 5A, 5B, 5C:
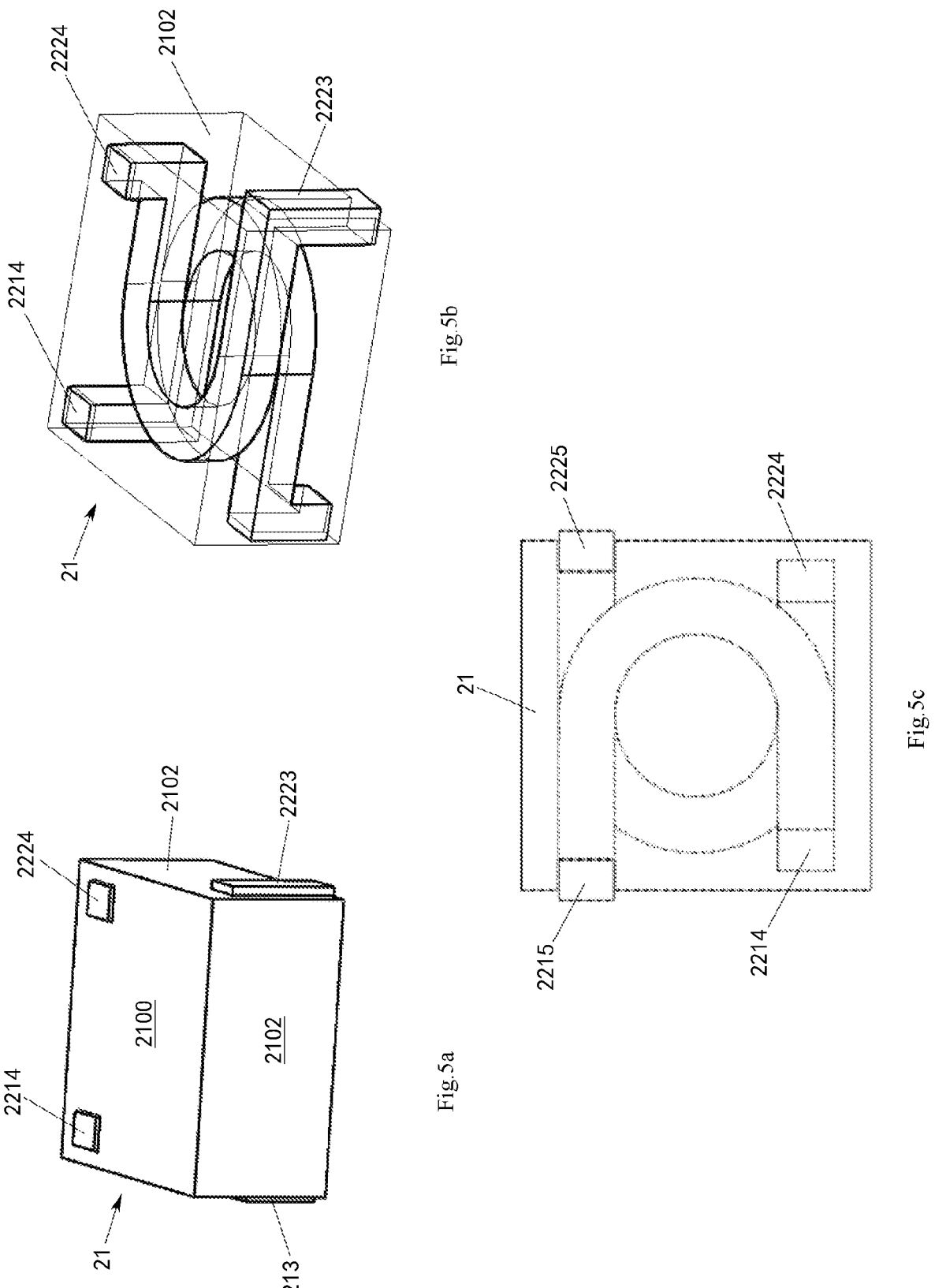

Referring to FIGS. 5a to 5c, FIGS. 5a and 5b are perspective views of an integrally-formed inductor according to the third embodiment of this disclosure, and FIG. 5c is a perspective bottom view of the integrally-formed inductor as shown in FIG. 5a.

The difference between the integrally-formed inductor of the third embodiment and that of the second embodiment lies in the different relationship between the longitudinal portion of the winding and the magnetic core 21, that is the longitudinal portion is not completely disposed inside the magnetic core 21, but at least partially exposed to the side surface 2102 of the magnetic core 21.

Specifically, the second longitudinal portion 2213 of the first winding 221 protrudes to the side surface 2102 of the magnetic core 21; the fourth longitudinal portion 2223 of the second winding 222 protrudes to the side surface 2102 of the magnetic core 21.

In some other embodiments, the longitudinal portion of the winding may be flush with the side surface 2102 of the magnetic core 21.

In the third embodiment, the pins of the integrally-formed inductor may still be formed on the top and bottom surfaces of the magnetic core, which still has the advantage that the path of the winding is short, and the efficiency can be improved.

The other structure of the integrally-formed inductor of the third embodiment is basically the same as that of the second embodiment, and will not be repeated here.

The Fourth Embodiment

Figures 6A, 6B, 6C:
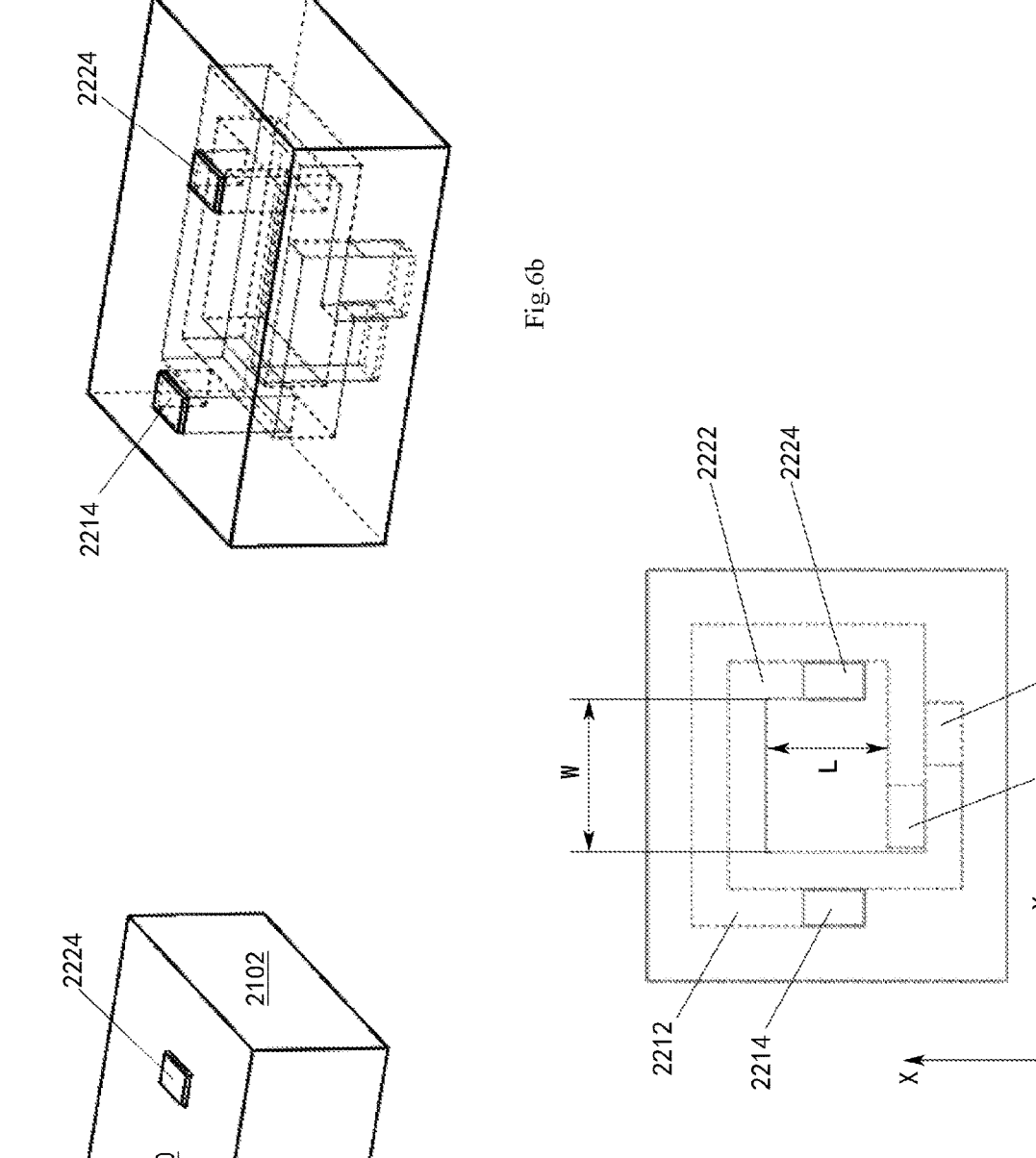
Figure 6E:
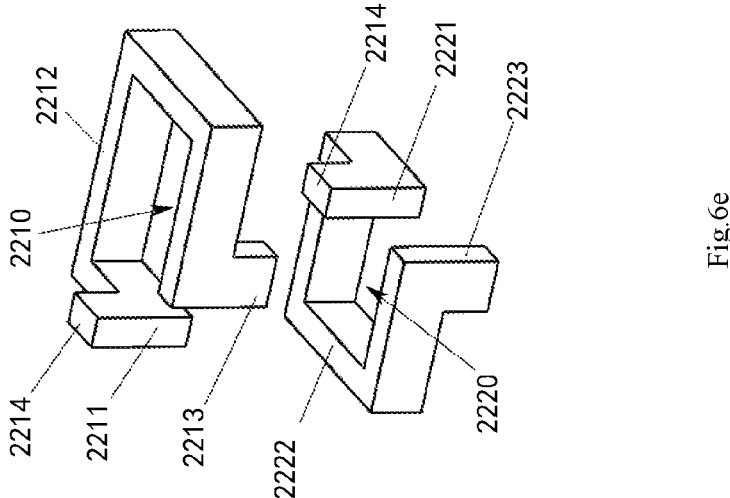
Figure 6D:
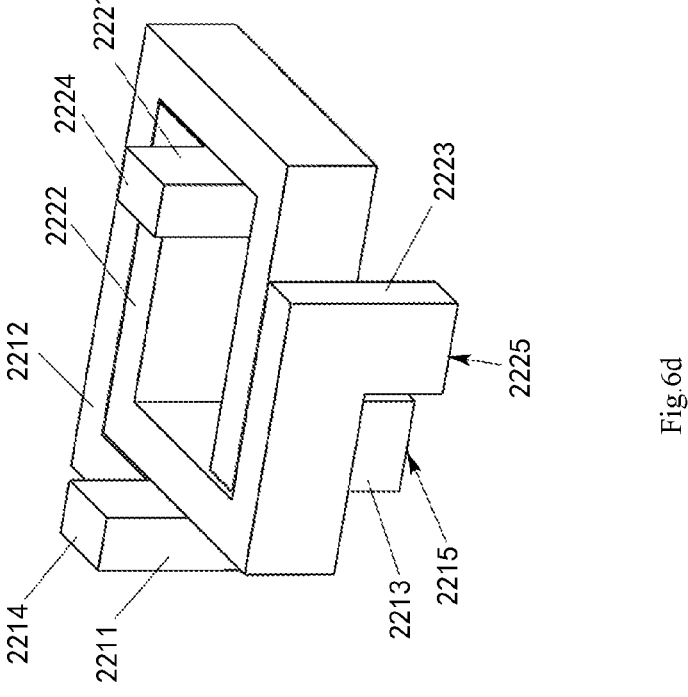

Referring to FIGS. 6a to 6e, FIG. 6a is a perspective view of an integrally-formed inductor according to the fourth embodiment of this disclosure; FIG. 6b is a perspective view of the integrally-formed inductor as shown in FIG. 6a; FIG. 6c is a perspective top view of FIG. 6a; FIG. 6d is a perspective view of assembled the first winding and the second winding in the integrally-formed inductor as shown in FIG. 6a; FIG. 6e is an exploded perspective view of the first winding and the second winding in the integrally-formed inductor as shown in FIG. 6a.

The difference between the integrally-formed inductor of the fourth embodiment and that of the first embodiment lies in different shapes of the lateral portion of the winding.

Specifically, the first connecting portion 2212 of the first winding 221 is in a rectangular shape with a notch, and a space enclosed by the first connecting portion in the rectangular shape is defined as a first space 2210. The first longitudinal portion 2211 and the second longitudinal portion 2213 of the first winding 221 are respectively connected to two sides of the notch of the rectangular shape.

The second connecting portion 2222 of the second winding 222 has a rectangular shape with a notch, and the space enclosed by the rectangular second connecting portion is defined as the second space 2220. The third longitudinal portion 2221 and the fourth longitudinal portion 2223 of the second winding 222 are respectively connected to both sides of the notch of rectangular shape.

The first connecting portion 2212 has at least a part, for example one rectangular side, located in the second space 2220. The second connecting portion 2222 has at least a part, for example two rectangular sides, located in the first space 2210.

That is to say, the first winding 221 and the second winding 222 are in contact with each other by overlapping. The so-called contact refers to a direct contact between the two windings, or there is only non-magnetic material such as insulation gasket or glue between the two windings for reinforcing insulation or fixing. The magnetic fluxes formed by the currents in the two windings at the overlapped portion are coupled to each other, such that the inductor forms a coupled inductor. When the current flows in from the first pin and the third pin, and flows out from the second pin and the fourth pin, the directions of the currents in the lateral portions of the winding are opposite, the inductor works in an inverse coupling state. The overlapped portion between the first connecting portion 2212 of the first winding and the second connecting portion 2222 of the second winding is longer, the coupling effect will be better.

As shown in FIG. 6c and FIG. 6d, the positions of the first pin 2214 and third pin 2224 of the integrally-formed inductor of the fourth embodiment may be flexibly adjusted along an X direction; the positions of the second pin 2215 and fourth pin 2225 of the inductor may be flexibly adjusted along a Y direction. The X direction is perpendicular to the Y direction. The four pins of the winding are flexibly disposed at different positions in the X and Y directions, such that the connecting portion 2212 of the first winding 221 and the connecting portion 2222 of the second winding 222 are overlapped to different degrees around the window, so as to flexibly adjust the leakage inductance and the coupling effect of the two windings.

A window surrounded by the lateral portions of the two windings on the XY plane has a width W in the Y direction and a length L in the X direction. By adjusting the length L and the width W, the overlapped length of the lateral portions of the two windings may also be further adjusted, so as to adjust the leakage inductance and coupling effect of the inductor.

The fourth embodiment has a more flexible way of adjusting the leakage inductance and the coupling effect, such adjustment cannot sacrifice the width of the winding and the equivalent sectional area of the window of the magnetic core, which facilitates improving the efficiency and the saturation current.

In the first embodiment, the lateral portions of the two windings are stacked up and down, the lateral portions of the two winding are in contact with each other, and only the sides that surround the window in the Y direction are projected and overlapped in the height direction T. The magnetic flux generated by the current in the projected and overlapped are coupled with each other; and the two sides of the two windings surrounding the window in the X direction are separated from each other, that is, are not overlapped, the magnetic flux generated by the current on the two sides is a leakage magnetic flux.

In the inductor of the fourth embodiment, the lateral portion of the winding is overlapped and contacted together, the first pin 2214 and the third pin 2224 may move flexibly in the X direction; the second pin 2215 and the fourth pin 2225 may move flexibly in the Y direction; the sides of the connecting portions 2212 and 2222 of the two winding are overlapped and connected with each other to different degrees. The overlapped length of the connecting portions of the winding that contributes to the coupling effect is far larger than the length of the two sides in the first embodiment.

The fourth embodiment can further improve the coupling effect. In the case of the same leakage inductance, a better coupling effect can obtain a larger steady-state inductance, which is beneficial to the improvement of efficiency.

In the inductor of the fourth embodiment, the first pin 2214 and third pin 2224 may move flexibly in the X direction, therefore they may be disposed in the middle of the magnetic core 21, that is, directly below the pad of the switching unit 101 in the integrated power module 1, and there is no lateral spacing between the pin of the inductor and the pad of the switching unit, so that the connection impedance of the horizontal circuit board trace (PCB Trace) does not exist; and furthermore, a soldering area between the pin and the pad of the switching unit is large, the connection impedance is small; at the same time, the second pin 2215 and fourth pin 2225 of the winding may move flexibly in the Y direction, and may be disposed closer to the load to reduce the distance between the inductor output pin and the load, thereby reducing the connection impedance of the PCB trace.

In the fourth embodiment, the impedance between the pin of the inductor and the pad of the switching unit is small, and the connection impedance between the pin of the inductor and the integrated power module is also small, which contributes to the improvement of the efficiency.

The other structure of the integrally-formed inductor of the fourth embodiment is basically the same as that of the first embodiment, and will not be repeated here.

The Fifth Embodiment

Referring to FIGS. 7a to 7i, which show the structure of the fifth embodiment of an integrally-formed inductor of this disclosure.

Figures 7A, 7B, 7C:
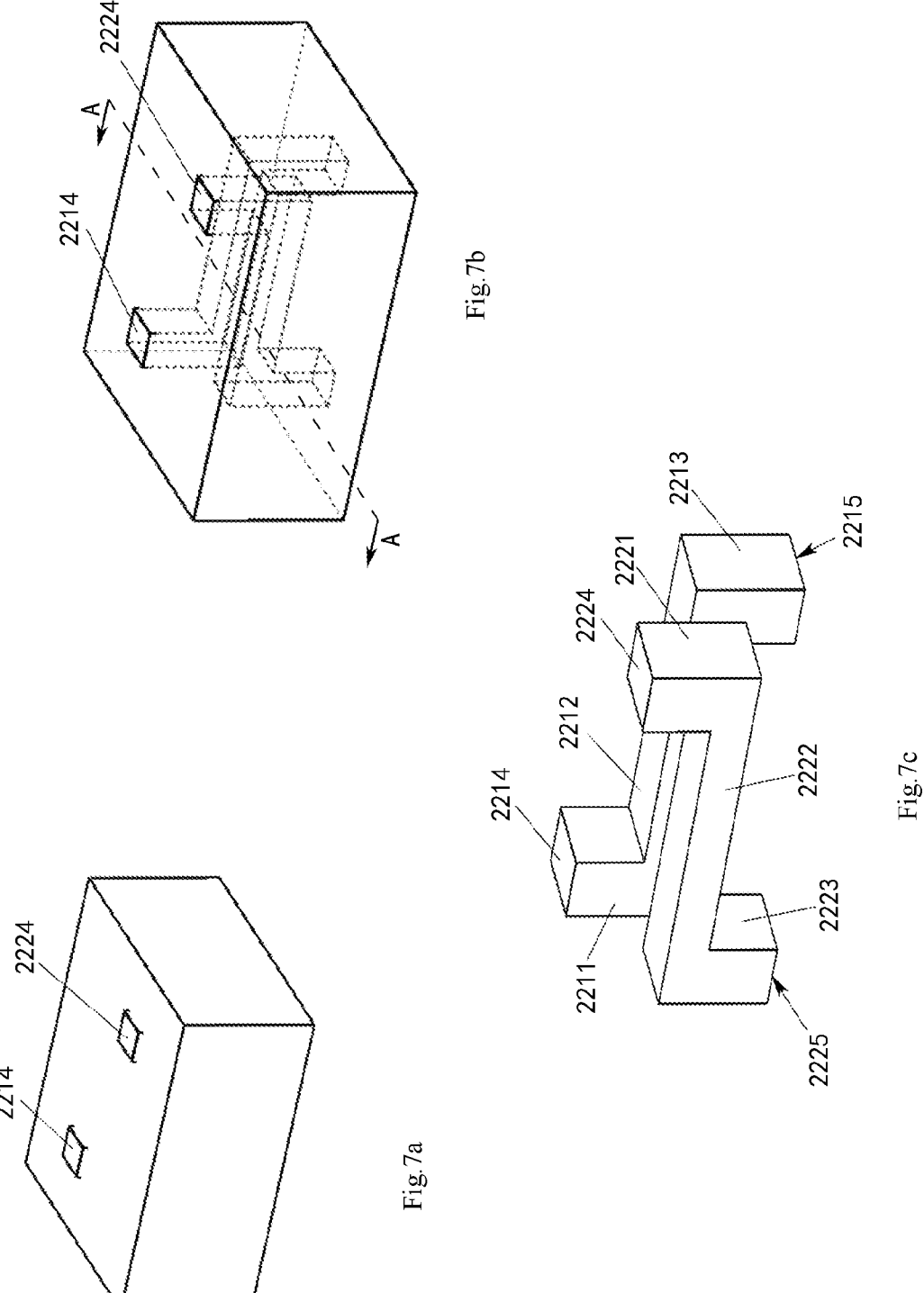

As shown in FIGS. 7a to 7c, FIG. 7a is a perspective view of an integrally-formed inductor according to the fifth embodiment of this disclosure; FIG. 7b is a perspective view of the integrally-formed inductor as shown in FIG. 7a; FIG. 7c is a perspective view of assembled the first winding and second winding in the integrally-formed inductor as shown in FIG. 7a.

The difference between the integrally-formed inductor of the fifth embodiment and that of the first embodiment lies in different shape of the lateral portion of the winding.

Specifically, the first connecting portion 2212 of the first winding 221 and the second connecting portion 2222 of the second winding 222 both have a straight linear shape.

The first longitudinal portion 2211 and the second longitudinal portion 2213 of the first winding 221 are respectively connected to two ends of the first connecting portion 2212 in the linear shape.

The third longitudinal portion 2221 and the fourth longitudinal portion 2223 of the second winding 222 are respectively connected to two ends of the second connecting portion 2222 in the linear shape.

In the inductor of the fifth embodiment, the lateral portion and the longitudinal portion of the winding are in the same plane, that is, the first longitudinal portion 2211 of the first winding 221, the first connecting portion 2212 in the lateral direction, and the second longitudinal portion 2213 in the longitudinal direction are in the same plane to form a Z-shaped winding. The third longitudinal portion 2221 of the second winding 222, the second connecting portion 2222 in the lateral direction, and the fourth longitudinal portion 2223 in the longitudinal direction are in the same plane to form a Z-shaped winding. Since the lateral portion and the longitudinal portion of the winding are in the same plane, compared with the winding in the first embodiment, the winding in this embodiment has smaller impedance and less winding loss, which facilitates the improvement of the efficiency. In addition, the Z-shaped winding is easier to process and manufacture, and the mold is simpler.

Figure 7E:
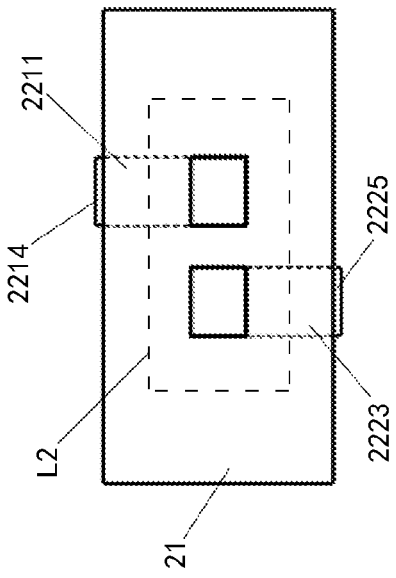
FIG. 7e is a sectional view taken along line A-A of FIG. 7b.
Figure 7D:
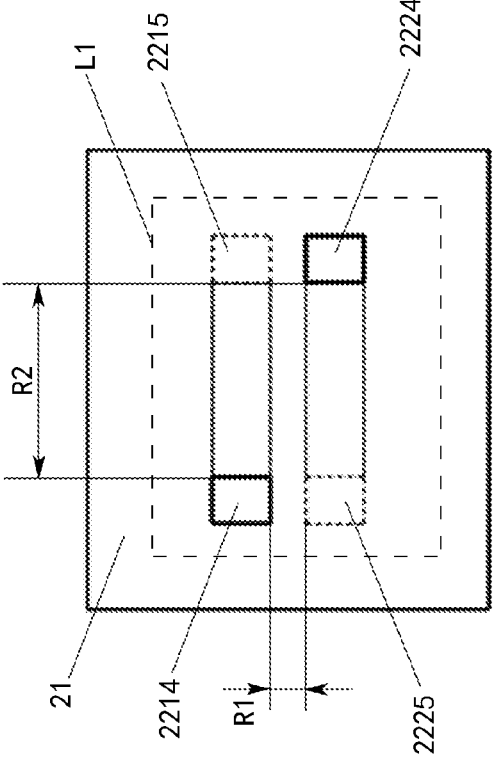
FIG. 7d is a perspective top view of FIG. 7b.
Figure 7G:
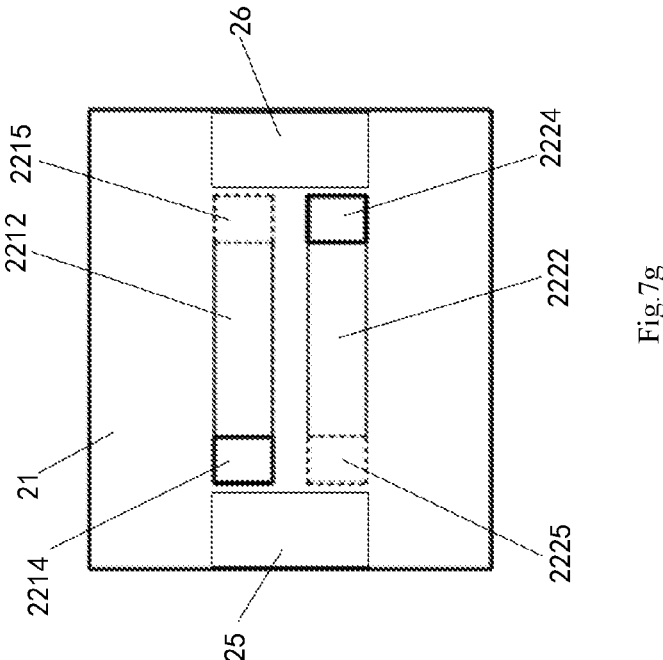
FIG. 7g is a perspective top view of FIG. 7b.
Figure 7F:
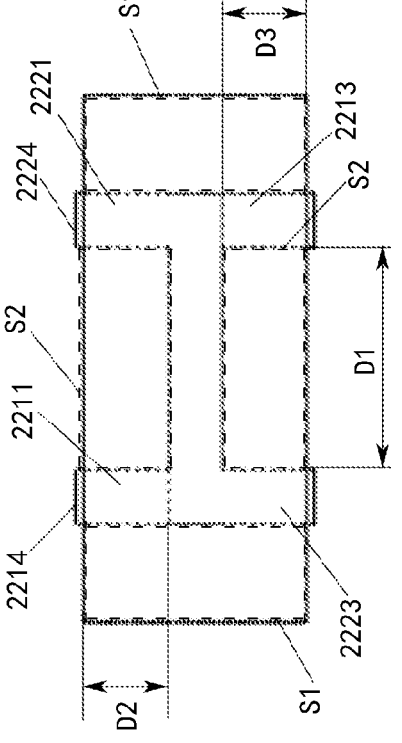
FIG. 7f is a perspective front view of FIG. 7b.
Figure 7I:
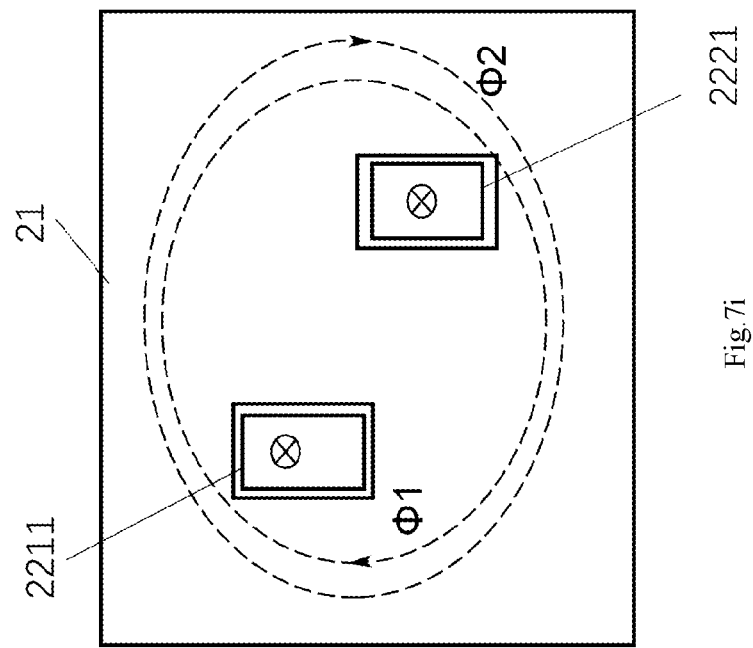
FIG. 7i is a distribution view of a mutual magnetic flux of the first winding and the second winding in the integrally-formed inductor as shown in the perspective top view of FIG. 7b.
Figure 7H:
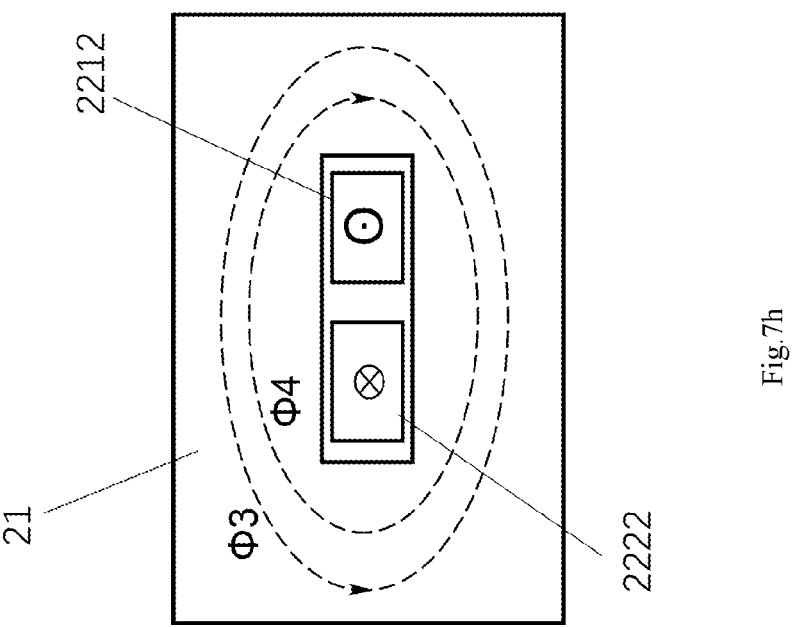
FIG. 7h is a distribution view of a mutual magnetic flux of the first winding and the second winding in the integrally-formed inductor as shown in the cross-sectional view taken along line A-A of FIG. 7b.

As shown in FIG. 7h and FIG. 7i, FIG. 7h is a distribution view of mutual magnetic flux generated by the current in the lateral portions of the first winding and the second winding in the integrally-formed inductor of this disclosure as shown in the A-A sectional view of FIG. 7b; FIG. 7i is a distribution view of the mutual magnetic flux generated by the current in the longitudinal portions of the first winding and the second winding in the integrally-formed inductor of this disclosure as shown in the perspective top view of FIG. 7b.

Since the longitudinal portion of the winding and the lateral portion of the winding are orthogonal or approximately orthogonal, the magnetic fluxes $\Phi 1$ and $\Phi 2$ generated by the current in the longitudinal portion of the winding cannot couple to the lateral portion of the winding; likewise, the magnetic fluxes $\Phi 3$ and $\Phi 4$ generated by the current in the lateral portion of the winding cannot couple to the longitudinal portion of the winding. Therefore, in order to simplify the discussion, the longitudinal portion and the lateral portion of the winding can be equivalent to the two coupled inductors being in series for analysis.

Figures 7J, 7K:
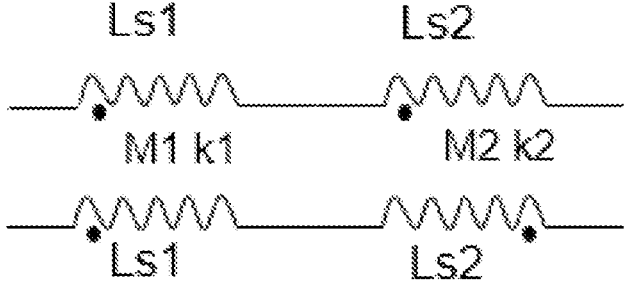
FIGS. 7j and 7k are equivalent circuit views of an inductor coupling.

As shown in FIG. 7*i*, when the current flows in from the first pin 2214 and the third pin 2224, the directions of the current in the longitudinal portion of the two windings are the same, so that the magnetic flux $\Phi 1$ generated by the longitudinal portion of the first winding and the magnetic flux $\Phi 2$ generated by the longitudinal portion of the second winding are strengthen to one another, the longitudinal portions of the two windings are in a positive coupling relationship. As shown in FIG. 7*h*, the directions of the current of the lateral portions of the two windings are opposite, and the magnetic flux $\Phi 3$ generated by the current in the lateral portion of the first winding and the magnetic flux $\Phi 4$ generated by the current in the lateral portion of the second winding are mutually canceled, the lateral portions of the two windings are in inverse coupling relationship. Therefore, the longitudinal portion of the winding may be equivalent to be one positively-coupled inductor, and the lateral portion of the winding may be equivalent to be an anti-coupled inductor, and an equivalent circuit view is shown in FIG. 7*j*, wherein Ls1, M1 and k1 are the positively-coupled parameters of the longitudinal portions of the winding, and Ls2, M2 and k2 are the anti-coupled parameters of the lateral portions of the windings. If the circuit as shown in FIG. 7*j* is presented as the inverse coupling inductor as shown in FIG. 7*k*, the inverse coupling in FIG. 7*j* is required to be stronger than the positive coupling, wherein L0, M0 and k0 are the coupled inductor parameters after being equivalent.

FIG. 7*d* is a perspective top view of FIG. 7*b*; FIG. 7*e* is an A-A sectional view of FIG. 7*b*; and FIG. 7*f* is a perspective front view of FIG. 7*b*.

As shown in FIG. 7*d*, FIG. 7*e* and FIG. 7*f*, L1 in FIG. 7*d* is an effective magnetic path length of the mutual magnetic flux generated by the current in the longitudinal portion of the first winding and the longitudinal portion of the second winding. L2 in FIG. 7*e* is an equivalent magnetic path length of the mutual magnetic flux generated by the current in the first connecting portion 2212 of the first winding 221 and the second connecting portion 2222 of the second winding 222. As shown in FIG. 7*f*, the equivalent sectional area of the mutual magnetic flux of the longitudinal portions of the two windings is S1, and the equivalent sectional area of the mutual magnetic flux of the lateral portions of the two windings is S2. The mutual magnetic flux path generated by the current in the longitudinal portions of the two windings is a first magnetic path, as such, the length of the first magnetic path is L1, and the equivalent sectional area of the first magnetic path is S1. The mutual magnetic flux path generated by the current in the lateral portions of the two windings is a second magnetic path, as such, the length of the second magnetic path is L2, and the equivalent sectional area of the second magnetic path is S2.

In order to make the inductor in this embodiment to be in an inverse coupling relationship as a whole, it is necessary to ensure that the magnetic fluxes $\Phi 1$ and $\Phi 2$ in the first magnetic path are smaller than the magnetic fluxes $\Phi 3$ and $\Phi 4$ in the second magnetic path, that is, magnetic resistances Rm1 and Rm2 of the first magnetic path are greater than magnetic resistances Rm3 and Rm4 in the second magnetic path.

The magnetic resistance of the magnetic core 21 has a formula: $Rm=le/(\mu e*Ae)$, wherein Rm is a magnetic resistance, le is an equivalent magnetic path length, $\mu e$ is an equivalent magnetic permeability, Ae is an equivalent magnetic path sectional area. It can be obtained from the formula of the magnetic resistance that the magnetic resistance Rm of the magnetic core 21 is proportional to the equivalent magnetic path length le of the magnetic path, and is inversely proportional to the equivalent magnetic permeability $\mu e$ of the magnetic core 21, and is inversely proportional to the equivalent magnetic path sectional area Ae of the magnetic path. In the fifth embodiment, the magnetic resistance of the first magnetic path is $Rm1=Rm2=L1/(\mu e*S1)$, and the magnetic resistance of the second magnetic path is $Rm3=Rm4=L2/(\mu e*S2)$.

When the material of the magnetic core 21 in the fifth embodiment is a magnetic material with the same permeability, the $\mu e$ in the first magnetic path and the second magnetic path are the same. Therefore, in order to realize that the magnetic resistances Rm1 and Rm2 are greater than the magnetic resistances Rm3 and Rm4, it is necessary to satisfy L1/S1>L2/S2, that is, L1/S1 is compared with L2/S2, the larger the L1/S1 is, the higher the inverse coupling degree is.

According to the above analysis of the magnetic resistance of the magnetic path, in order to achieve the overall inverse coupling, the first method used in the fifth embodiment is to adjust the length relationship between the lateral portion and the longitudinal portions of the winding. Specifically, the length D1 of the lateral portion of the winding is longer, the magnetic path length L1 of the first magnetic path, and the equivalent sectional area of the first magnetic path is smaller, therefore, the magnetic resistance of the first magnetic path is greater; and at this time the magnetic path length of the second magnetic path remains unchanged, the equivalent sectional area of the second magnetic path is larger, therefore, the magnetic resistance of the second magnetic path is less, the lengths D2 and D3 of the longitudinal portions of the winding are shorter, the magnetic path length of the first magnetic path is not changed, the equivalent magnetic path area of the first magnetic path is smaller, therefore, the magnetic resistance of the first magnetic path is greater. Therefore, in this embodiment, inverse coupling can be achieved by setting the length D1 of the lateral portion of the first winding 221 to be greater than the sum of the length D2 of the first longitudinal portion 2211 and the length D3 of the second longitudinal portion 2213 of the first winding 221, and the length D1 of the lateral portion of the second winding 222 to be greater than the sum of the length D2 of the third longitudinal portion 2221 and the length D3 of the fourth longitudinal portion 2223 of the second winding 222.

According to the above analysis of the magnetic resistance of the magnetic path, in order to realize the inverse coupling as a whole, the second method used in the fifth embodiment is to adjust the relationship between a distance between the lateral portions of the two windings and a distance between the longitudinal portions of each winding. Specifically, as shown in FIG. 7*d*, the distance between the lateral portions of the two windings is R1, and the distance between the longitudinal portions of each winding is R2. When the R1 is smaller, the magnetic path length L2 of the second magnetic path is smaller, and the magnetic resistance of the second magnetic path is smaller, and the inverse coupling of the lateral portions of the winding is stronger. When the R2 is larger, the effect thereof is as large as the effect of the above-mentioned size D1. Therefore, in this embodiment, in order to realize inverse coupling, the size of the R2 is required to be larger than the size of the R1.

In summary, if the length of the lateral portions of the two windings is longer, a distance between the two windings is closer, the length of the longitudinal portions of each winding is shorter, the inverse coupling is better; conversely, if the length of the lateral portions of the two windings is shorter, the distance between the two windings is farther, the length of the longitudinal portions of the two windings is longer, the inverse coupling is worse.

According to the above analysis of the magnetic resistance of the magnetic path, in order to achieve the overall inverse coupling, the third method used in the fifth embodiment is to set the magnetic resistances of the first magnetic path and the second magnetic path by using magnetic core materials with different permeability. Specifically, according to the formula of the above magnetic resistance, the inverse coupling can also be achieved by arranging the magnetic materials with different magnetic permeability in the first magnetic path and the second magnetic path, for example, a magnetic material with high permeability is disposed in the second magnetic path to make the Rm3 and Rm4 smaller, and a magnetic material with low permeability or an air gap is disposed in the first magnetic path to make the Rm1 and Rm2 larger. As shown in FIG. 7g, a region 25 and a region 26 may be set as the magnetic material with low permeability or the air gap. When the Rm3 and Rm4 are smaller than the Rm1 and Rm2, the magnetic fluxes D3 and D4 are larger than the magnetic fluxes D1 and D2, and the inductor realizes the inverse coupling.

According to the above analysis of the magnetic resistance of the magnetic path, in order to achieve the overall inverse coupling, the fourth method used in the fifth embodiment is to only adjust the length of the magnetic path, for example, when the sectional area of each of the longitudinal portions of the two windings is set to be larger than the sectional area of each of the connecting portions of the two windings, the magnetic path length of the first magnetic path is longer than the magnetic path length of the second magnetic path, and when the sectional area of the first magnetic path is equal to that of the second magnetic path, the magnetic resistances Rm1, Rm2 of the first magnetic path are greater than the magnetic resistances Rm3, Rm4 of the second magnetic path, and the magnetic fluxes Φ3, Φ4 are greater than the magnetic fluxes Φ1, Φ2, and the inductor can realize the inverse coupling.

It is possible in this embodiment that the magnetic resistance of the first magnetic path is set to be smaller than the magnetic resistance of the second magnetic path, so that the inductor overall presents a positive coupling relationship; or the magnetic resistance of the first magnetic path is set to be equal to the magnetic resistance of the second magnetic path, so that the inductor overall presents a de-coupling relationship. Therefore, this embodiment can also be flexibly adjusted to realize the inverse coupling, the positive coupling or the de-coupling.

The other structures of the integrally-formed inductor of the fifth embodiment are basically the same as that of the first embodiment, and will not be repeated here.

The Sixth Embodiment

Referring to FIGS. 8a to 8f, which show the structure of the sixth embodiment of an integrally-formed inductor of this disclosure.

Figures 8A, 8B, 8C:
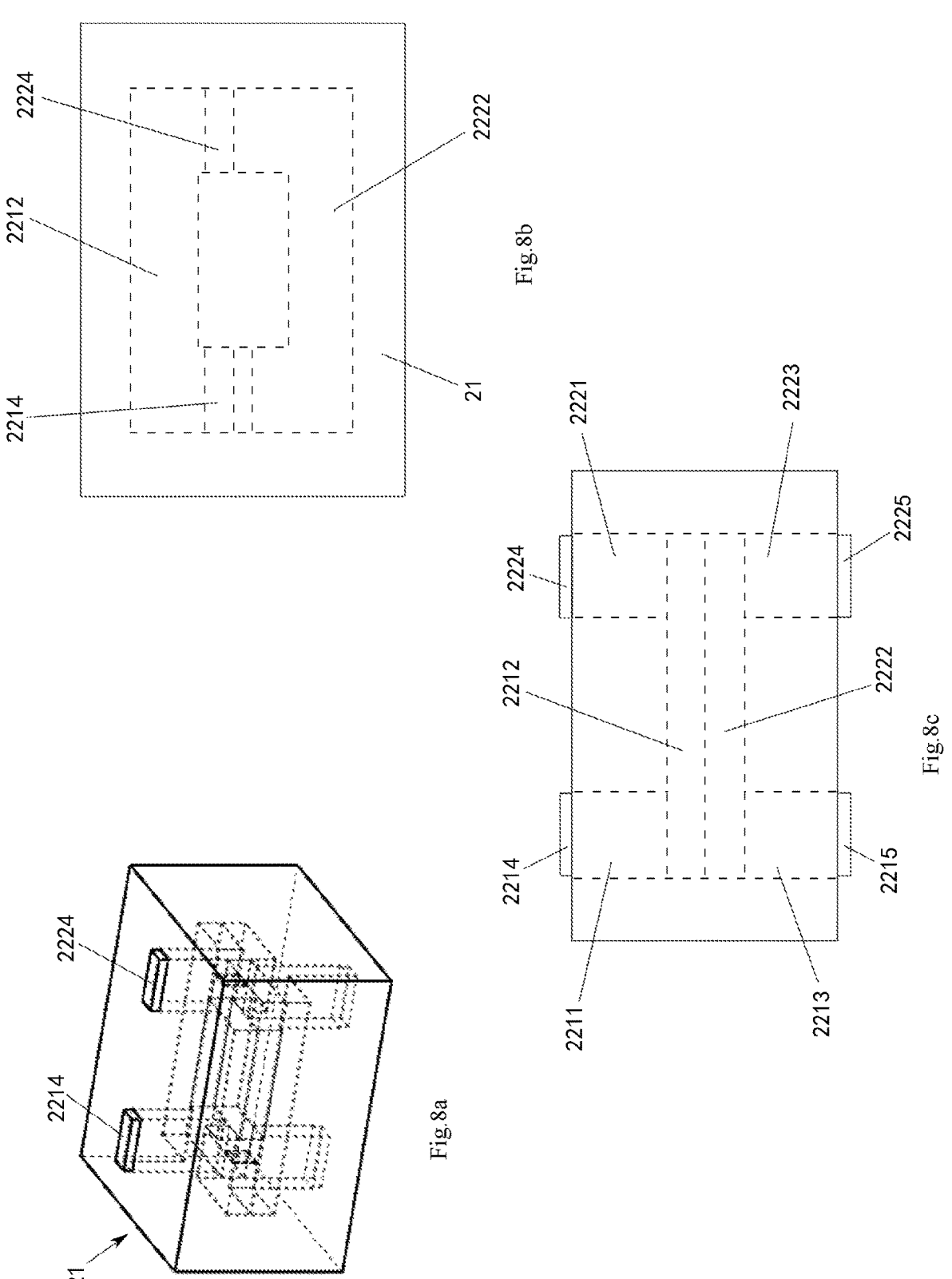
Figures 8D, 8E, 8F:
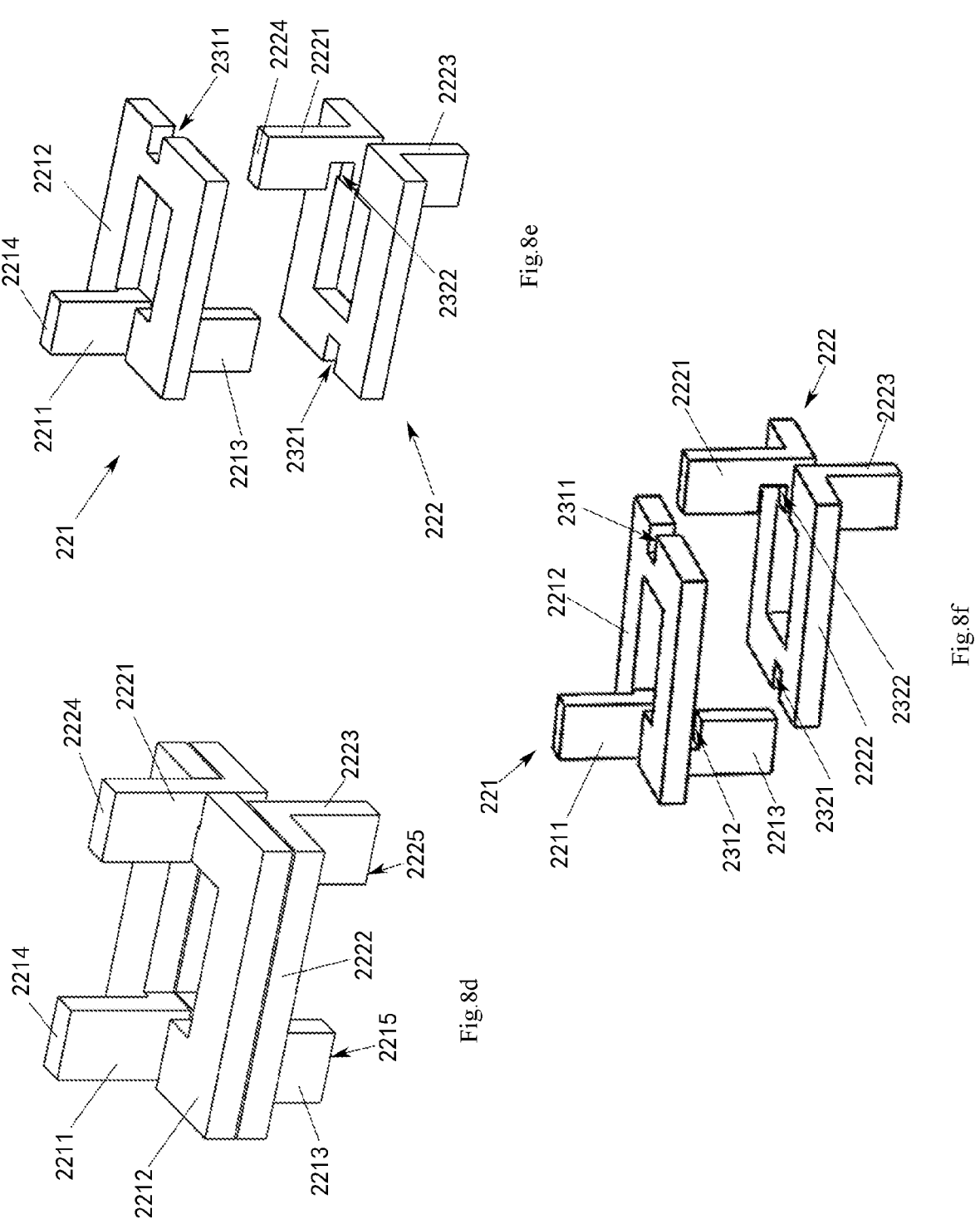

FIG. 8a is a perspective view of an integrally-formed inductor according to the sixth embodiment of this disclosure; FIG. 8b is a perspective top view of the integrally-formed inductor as shown in FIG. 8a; FIG. 8c is a perspective front view of the integrally-formed inductor as shown in FIG. 8a; FIG. 8d is a perspective view of assembled the first winding and second winding in the integrally-formed inductor as shown in FIG. 8a; FIG. 8e is an exploded perspective view of the first winding and second winding as shown in FIG. 8d observed from an angle; FIG. 8f is an exploded perspective view of the first winding and second winding as shown in FIG. 8d observed from another angle.

The difference between the integrally-formed inductor of the sixth embodiment and that of the first embodiment lies in that the winding structure is different.

Specifically, in the sixth embodiment, the winding includes a first winding 221 and a second winding 222.

A first winding 221 is formed by connecting a first longitudinal portion 2211 in a longitudinal direction, a first connecting portion 2212 in a lateral direction and a second longitudinal portion 2213 in a longitudinal direction in sequence, wherein the first connecting portion 2212 is rectangular with notch. The first longitudinal portion 2211 of the first winding 221 extends from the inside of the magnetic core 21 to a top surface 2100 of the magnetic core 21 and forms a first pin 2214 of an inductor on the top surface 2100 of the magnetic core 21; the second longitudinal portion 2213 of the first winding 221 extends from the inside of the magnetic core 21 to the bottom surface 2101 of the magnetic core 21, and forms a second pin 2215 of the inductor on the bottom surface 2101 of the magnetic core 21.

A second winding 222 is formed by connecting a third longitudinal portion 2221 in a longitudinal direction, a second connecting portion 2222 in a lateral direction and a fourth longitudinal portion 2223 in a longitudinal direction in sequence, wherein the second connecting portion 2222 is rectangular. The third longitudinal portion 2221 of the second winding 222 extends from the inside of the magnetic core 21 to the top surface 2100 of the magnetic core 21, and forms a third pin 2224 of the inductor on the top surface 2100 of the magnetic core 21; and the fourth longitudinal portion 2223 of the second winding 222 extends from the inside of the magnetic core 21 to the bottom surface 2101 of the magnetic core 21, and forms a fourth pin 2225 of the inductor on the bottom surface 2101 of the magnetic core 21.

The first connecting portion 2212 of the first winding 221 is provided with a first notch 2311, and the second longitudinal portion 2213 is provided with a second notch 2312; the second connecting portion 2222 of the second winding 222 is provided with a third notch 2321, and the third longitudinal portion 2221 is provided with a fourth notch 2322.

The first connecting portion 2212 of the first winding 221 and the second connecting portion 2222 of the second winding 222 are stacked up and down. In order to realize the stacked arrangement of the two connecting portions of the two windings, the third longitudinal portion 2221 of the second winding 222 is disposed crossly with the first connecting portion 2212 of the first winding 221 at the first notch 2311 and the fourth notch 2322, and the second longitudinal portion 2213 of the first winding is disposed crossly with the second connecting portion 2222 of the second winding 222 at the second notch 2312 and the third notch 2321.

In the integrally-formed inductor of the sixth embodiment, the lateral portions of the two windings are stacked by the arrangement of the notches, and the longitudinal portions can avoid the interference of the lateral portions. In this embodiment, the winding is provided with notches to increase the stacked length of the lateral portions of the two windings, so that the coupling effect is good.

The other structures of the integrally-formed inductor of the sixth embodiment are basically the same as that of the first embodiment, and will not be repeated here.

The Seventh Embodiment

Referring to FIGS. 9a to 9e, which show the structure of the seventh embodiment of an integrally-formed inductor of this disclosure.

Figure 9B:
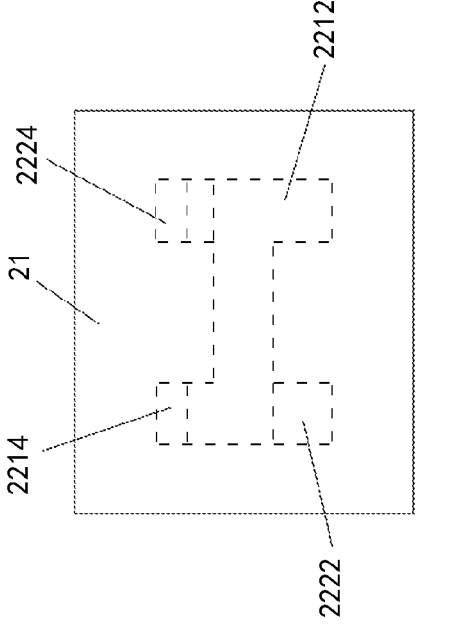
Figure 9A:
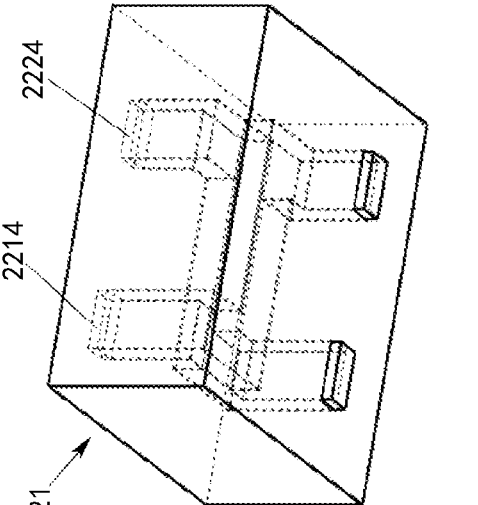
FIG. 9a is a perspective view of an integrally-formed inductor according to another embodiment of this disclosure.
Figure 9C:
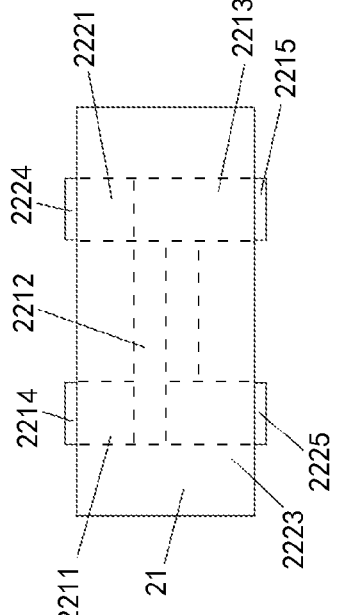
Figure 9D:
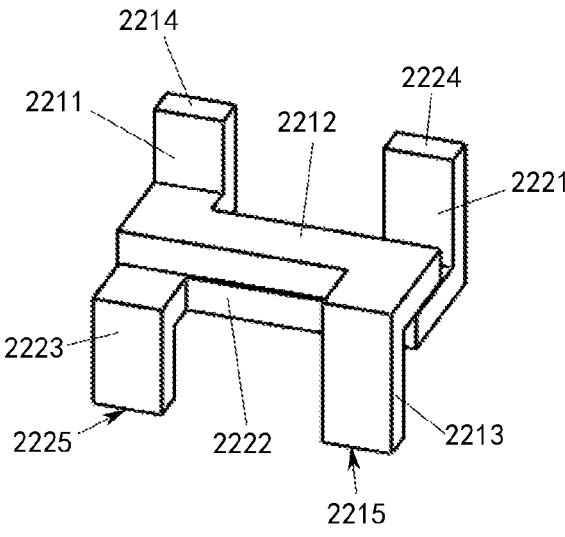
Figure 9E:
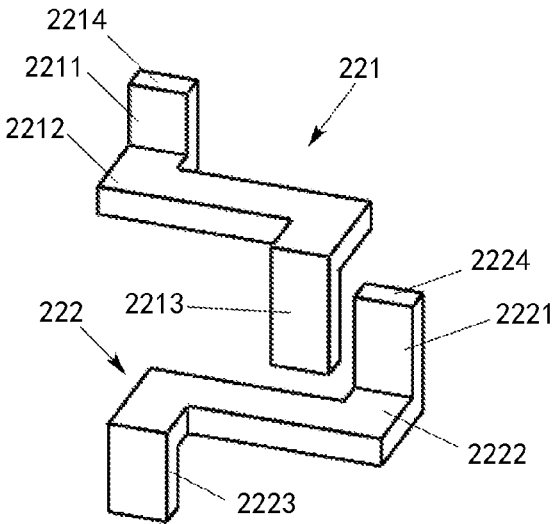
FIG. 9e is an exploded perspective view of the first winding and the second winding as shown in FIG. 9d.

FIG. 9a is a perspective view of an integrally-formed inductor according to the seventh embodiment of this disclosure; FIG. 9b is a perspective top view of the integrally-formed inductor as shown in FIG. 9a; FIG. 9c is a perspective front view of the integrally-formed inductor as shown in FIG. 9a; FIG. 9d is a perspective view of assembled the first winding and second winding in the integrally-formed inductor as shown in FIG. 9a; FIG. 9e is an exploded perspective view of the first winding and second winding as shown in FIG. 9d.

The difference between the integrally-formed inductor of the seventh embodiment and that of the first embodiment lies in that the lateral portions of the winding structure are different.

Specifically, in the seventh embodiment, the lateral portion of the first winding 221 (i.e., the first connecting portion 2212) is in a Z shape; and the second connecting portion 2222 of the second winding 222 is in a Z shape.

In the integrally-formed inductor of the seventh embodiment, compared with the winding in the first embodiment, an area of the lateral portion is increased, and a larger leakage inductance can be obtained in some applications.

The other structures of the integrally-formed inductor of the seventh embodiment are basically the same as that of the fifth embodiment, and will not be repeated here.

The magnetic core 21 in the integrally-formed inductor of this disclosure may be made of materials with the same magnetic permeability, or may be made of a plurality of magnetic powder materials with different magnetic permeability.

The embodiments of this disclosure have at least advantages or advantageous effect as follows: In the integrally-formed inductor of this disclosure, the first longitudinal portion of the first winding extends to the first surface of the magnetic core, and forms the first pin on the first surface, to be directly electrically connected with the integrated power module, thereby maximizing the improvement of the heat dissipation effect. Further, the projection of the first longitudinal portion on the first surface is within a ranged of the magnetic core, that is, the first longitudinal portion extends upwardly inside the magnetic core, so as to facilitate shortening the path length of the first winding, and in a low voltage and a high current working condition of the VRM, shorter path length of the winding can reduce DC loss and improve the efficiency. In addition, since the first longitudinal portion is inside the magnetic core, the VRM power connection component can be conveniently disposed on an external side surface of the magnetic core, so as to make the configuration of the power connection component more flexible. At the same time, the first winding and the magnetic core are pressed together by a mold to form the inductor, which is simple in structure and easier to manufacture.

In the embodiments of this disclosure, the terms "first" and "second" are merely used for the purpose of description and cannot be interpreted to indicate or imply relative importance; the term "a plurality of" refers to two or more, unless otherwise explicitly defined; the terms "install", "connect with", "connect to" and "fix" shall be broadly understood, for example, "connect to" may be a fixed connection, a detachable connection, or an integrated connection; "connect with" may be direct connection or indirect connection through an intermediate media. For the skilled person in the art, the specific meanings of the above terms in the embodiments of the present disclosure can be understood depending on specific context.

In the description of the embodiments of this disclosure, it should be understood that an orientation or position relations indicated by the terms "up", "down", "left", "right", "before" and "after" are based on the orientation or position relations as shown in the drawings, in order for the convenience of describing the embodiments and simplifying the description, rather than indicating or implying that the device or the unit as indicated must have a particular orientation and can be constructed and operated in a particular orientation, so that it cannot be understood as limiting the embodiments of this disclosure.

In the description of this specification, the description of the terms "one embodiment", "some embodiments" and "specific embodiments", etc., is directed to that specific features, structures, materials or features described in combination with the embodiment or example are contained in at least one of the embodiments or examples of this disclosure. In this specification, illustrative expressions of the above terms do not necessarily refer to the same embodiments or examples. Furthermore, the specific features, structures, materials or features described may be assembled in a suitable manner in one or more embodiments or examples.

The above are merely the preferred ones of the embodiments of this disclosure, and are not used to limit the embodiments of this disclosure. For the skilled person in the art, the embodiments of this disclosure can have various changes and variations. Any modification, equivalent substitution, improvement etc. made in the spirit and principle of the embodiments of this disclosure shall be included in the protection scope of the embodiments of this disclosure.

What is claimed is:

1. An integrally-formed inductor, comprising:
a magnetic core comprising a first surface, a second surface, and a side surface, the first surface and the second surface being disposed opposite to each other, and the side surface being disposed between the first surface and the second surface; and
a first winding comprising a first longitudinal portion, a second longitudinal portion, and a first connecting portion being provided between the first longitudinal portion and the second longitudinal portion;
wherein the first longitudinal portion extends to the first surface, and a projection of the first longitudinal portion on the first surface is within a range of the magnetic core, and the first longitudinal portion forms a first pin on the first surface;
the second longitudinal portion extends to a plane where the second surface is positioned, and forms a second pin on the plane where the second surface is positioned; and
the first winding and the magnetic core are integrally pressed by a mold to form the inductor;
wherein a projection length of the first winding in a horizontal direction is greater than a projection length of the first winding in a height direction of the magnetic core, the horizontal direction is perpendicular to the height direction of the magnetic core, and the height direction refers to a direction from the first surface to the second surface of the magnetic core,
wherein the inductor further comprising:

a second winding comprising a third longitudinal portion, a fourth longitudinal portion, and a second connecting portion being provided between the third longitudinal portion and the fourth longitudinal portion;

wherein the third longitudinal portion extends to the first surface, and forms a third pin on the first surface, the fourth longitudinal portion extends to a plane where the second surface is positioned, and forms a fourth pin on the plane where the second surface is positioned.

2. The inductor of claim 1, wherein the first winding is buried in the magnetic core, and a distance between the first winding and the side surface of the magnetic core is not less than 300 μm.

3. The inductor of claim 1, wherein the second longitudinal portion at least partially exposes to the side surface.

4. The inductor of claim 1, wherein a projection of the third longitudinal portion on the first surface is within a range of the magnetic core.

5. The inductor of claim 1, wherein the second winding is buried in the magnetic core, and a distance between the second winding and the side surface is not less than 300 μm.

6. The inductor of claim 1, wherein the fourth longitudinal portion at least partially exposes to the side surface.

7. The inductor of claim 1, wherein:

the first connecting portion is U-shaped, arc-shaped, C-shaped, straight line-shaped, Z-shaped or racetrack-shaped, or the first connecting portion is rectangular with a notch; and the second connecting portion is U-shaped, arc-shaped, C-shaped, straight line-shaped, Z-shaped or racetrack-shaped, or the second connecting portion is rectangular with a notch.

8. The inductor of claim 1, wherein the first connecting portion and the second connecting portion are at least partially stacked along a height direction of the magnetic core.

9. The inductor of claim 1, wherein the first connecting portion and the second connecting portion are stacked along a width direction of the magnetic core.

10. The inductor of claim 1, wherein when a current flows through the first winding from the first pin and flows through the second winding from the third pin, the magnetic fluxes generated by the current in the first connecting portion and the second connecting portion are weakened.

11. The inductor of claim 10, wherein a minimum separation distance between the first connecting portion and the second connecting portion is smaller than a minimum separation distance between the first longitudinal portion and the third longitudinal portion.

12. The inductor of claim 10, wherein a length of the first connecting portion is greater than a sum of a length of the first longitudinal portion and a length of the second longitudinal portion, and a length of the second connecting portion is greater than a sum of the length of the third longitudinal portion and the length of the fourth longitudinal portion.

13. The inductor of claim 10, wherein a sectional area of the first longitudinal portion, a sectional area of the second longitudinal portion, a sectional area of the third longitudinal portion, and a sectional area of the fourth longitudinal portion all are larger than a sectional area of the first connecting portion and a sectional area of the second connecting portion.

14. The inductor of claim 1, wherein:

the first connecting portion is rectangular with a notch, and a space enclosed by the first connecting portion is defined as a first space, the second connecting portion is rectangular with a notch, and a space enclosed by the second connecting portion is defined as a second space, the first connecting portion is at least partially located in the second space, and the second connecting portion is at least partially located in the first space.

15. The inductor of claim 1, wherein:

the first connecting portion is rectangular, the first connecting portion is provided with a first notch, the second longitudinal portion is provided with a second notch; the second connecting portion is rectangular, and the second connecting portion is provided with a third notch, the third longitudinal portion is provided with a fourth notch, wherein the first connecting portion and the second connecting portion are stacked along a height direction of the magnetic core by matching the first notch and the fourth notch with each other and matching the second notch and the third notch with each other.

16. The inductor of claim 1, wherein the magnetic core is made of magnetic powder with distributed air gap.

17. A power supply module, comprising an integrally-formed inductor according to claim 1 and an integrated power module, wherein the integrated power module is stacked on the first surface of the magnetic core and comprises a first switching unit, wherein the first switching unit is electrically connected with the first pin;

the second pin is configured as a first power output terminal of the power supply module.

18. The power supply module of claim 17, wherein the inductor further comprises:

a second winding comprising a third longitudinal portion, a fourth longitudinal portion, and a second connecting portion being provided between the third longitudinal portion and the fourth longitudinal portion, wherein the third longitudinal portion extends to the first surface, and forms a third pin on the first surface, the fourth longitudinal portion extends to a plane where the second surface is positioned, and forms a fourth pin on the plane wherein the second surface is positioned;

the integrated power module further comprises a second switching unit, and the second switching unit is electrically connected with the third pin; and the fourth pin is configured as a second power output terminal of the power supply module.

19. The power supply module of claim 18, further comprising:

a power connection component and a signal connection component disposed on the side surface of the magnetic core.

* * * * *